(12) United States Patent
Valli et al.

(10) Patent No.: US 10,762,712 B2
(45) Date of Patent: Sep. 1, 2020

(54) APPARATUS AND METHOD FOR SUPPORTING INTERACTIVE AUGMENTED REALITY FUNCTIONALITIES

(71) Applicant: PCMS Holdings, Inc., Wilmington, DE (US)

(72) Inventors: Seppo T. Valli, Espoo (FI); Pekka K. Siltanen, Helsinki (FI)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 16/087,029

(22) PCT Filed: Mar. 24, 2017

(86) PCT No.: PCT/US2017/024072
§ 371 (c)(1),
(2) Date: Sep. 20, 2018

(87) PCT Pub. No.: WO2017/172528
PCT Pub. Date: Oct. 5, 2017

(65) Prior Publication Data
US 2019/0108683 A1 Apr. 11, 2019

Related U.S. Application Data

(60) Provisional application No. 62/316,884, filed on Apr. 1, 2016.

(51) Int. Cl.
*G06T 19/00* (2011.01)
*H04N 7/15* (2006.01)
(Continued)

(52) U.S. Cl.
CPC ............ *G06T 19/006* (2013.01); *G06T 15/20* (2013.01); *G06T 17/05* (2013.01); *G06T 19/003* (2013.01); *H04N 7/157* (2013.01)

(58) Field of Classification Search
CPC . H04N 13/275; H04N 13/194; G06T 2200/08
(Continued)

(56) References Cited

U.S. PATENT DOCUMENTS 4,400,724 A 8/1983 Fields
7,515,174 B1 4/2009 Francisco
(Continued)

FOREIGN PATENT DOCUMENTS

| EP | 2400464 A2 | 12/2011 |
| EP | 2400646 A2 | 12/2011 |
| WO | 2009036782 A1 | 3/2009 |

OTHER PUBLICATIONS

Notification of Transmittal of the International Search Report and Written Opinion of the International Searching Authority, or Declaration for PCT/US2017/024072 dated Jul. 28, 2017, 18 pages.
(Continued)

*Primary Examiner* — Thomas J Lett
(74) *Attorney, Agent, or Firm* — Invention Mine LLC

(57) ABSTRACT

Augmented reality (AR) telepresence systems and methods are disclosed for obtaining a 3D model of a physical location from a 3D-capture system comprising one or more 3D depth sensors disposed throughout the physical location, generating a truncated 3D model of the physical location, the truncated 3D model corresponding to the intersection of the generated 3D model and a field of view of a user terminal camera at the physical location, and transmitting the truncated 3D model to a remote location.

20 Claims, 16 Drawing Sheets

(51) Int. Cl.
  *G06T 15/20* (2011.01)
  *G06T 17/05* (2011.01)
(58) Field of Classification Search
  USPC ........................................................ 345/419
  See application file for complete search history.

(56) References Cited

U.S. PATENT DOCUMENTS

| | | | |
|---|---|---|---|
| 7,840,638 | B2 | 11/2010 | Zhang |
| 8,134,556 | B2 | 3/2012 | Elsberg |
| 8,212,872 | B2 | 7/2012 | Sablak |
| 8,675,067 | B2 | 3/2014 | Chou |
| 8,872,817 | B2 | 10/2014 | Kim |
| 8,976,224 | B2 | 3/2015 | Smith |
| 2002/0010734 | A1 | 1/2002 | Ebersole |
| 2002/0080094 | A1 | 6/2002 | Biocca |
| 2010/0259595 | A1* | 10/2010 | Trimeche ......... H04N 21/21805 348/43 |
| 2012/0098965 | A1 | 4/2012 | Barcala |
| 2013/0109961 | A1 | 5/2013 | Bose |
| 2013/0117377 | A1 | 5/2013 | Miller |
| 2013/0321593 | A1 | 12/2013 | Kirk |
| 2014/0232816 | A1 | 8/2014 | Wilson |
| 2014/0240444 | A1 | 8/2014 | Szymczyk |
| 2014/0247212 | A1 | 9/2014 | Kim |
| 2014/0320529 | A1 | 10/2014 | Roberts |
| 2015/0215351 | A1 | 7/2015 | Barzuza |
| 2015/0215581 | A1 | 7/2015 | Barzuza |
| 2016/0353056 | A1* | 12/2016 | Cullen ................ G06K 9/00221 |
| 2017/0200317 | A1* | 7/2017 | Hannemann .............. G06T 7/13 |
| 2019/0042832 | A1* | 2/2019 | Venshtain .................. G06T 7/75 |
| 2019/0253667 | A1* | 8/2019 | Valli ..................... G02B 27/017 |

OTHER PUBLICATIONS

Bao P et al: "Mobile collaborative walkthrough using 3D image warping and streaming", Information Technology Interfaces, 2004. 26th International Conference on Cavtat, Croatia Jun. 7-10, 2004, Piscataway, NJ, USA, IEEE, Jun. 7, 2004 (Jun. 7, 2004), pp. 279-285 vol. 1, XP032126540, ISBN: 978-953-96769-9-3, the whole document.
Written Opinion of the International Preliminary Examining Authority for PCT/US2017/024072 dated Mar. 1, 2018.
International Preliminary Report on Patentability for PCT/US2017/024072 completed on Jun. 11, 2018.
Notification of Transmittal of the International Search Report and Written Opinion of the International Searching Authority, or Declaration for PCT/US2017/026378 dated Jun. 29, 2017, 16 pages.
Henry Chen et al: "3D Collaboration Method over HoloLens (TM) and Skype(TM) End Points", Immersive Media Experiences, ACM, 2 Penn Plaza, Suite 701 New York NY 10121-0701 USA, Oct. 30, 2015 (Oct. 30, 2015). pp. 27-30, XP058074925, DOI: 10.1145/2814347.2814350, ISBN: 978-1-4503-3745-8.
Irlitti Andrew et al: "Tangible interaction techniques to support asynchronous collaboration", 2013 IEEE International Symposium on Mixed and Augmented Reality (ISMAR), IEEE, Oct. 1, 2013 (Oct. 1, 2013), pp. 1-6, XP032534747, DOI: 10.1109/ISMAR.2013.6671840, [retrieved on Nov. 20, 2013] abstract, paragraph [What_are_the_benefits].
Written Opinion of the International Preliminary Examining Authority for PCT/US2017/026378 dated Mar. 6, 2018.
International Preliminary Report on Patentability for PCT/US2017/026378 completed on Jul. 3, 2018.
Maimone, A. et. al., "Real-Time Volumetric 3D Capture of Room-Sized Scenes for Telepresence", 3DTV Conference: The True Vision—Capture, Transmission and Display of 3D Video, 3DTV-CON 2012, Zurich, Switzerland, Oct. 15-17, 2012.
Knies, R (2009), "Making Virtual Meetings Feel Real". Microsoft Research , Mar. 9, 2009, 6 pages, at: http://research.microsoft.com/en-us/news/features/personaltelepresencestation-030909.aspx.

Buxton, W., et. al., "Interfaces for Multiparty Videoconferencing". K. Finn, A. Sellen & S. Wilber (Eds.). Video Mediated Communication. (1997), pp. 385-400.
Siltanen, P., et. al., "An Architecture for Remote Guidance Service", Transdisciplinary Lifecycle Analysis of Systems. IOS Press, Advances in Transdisciplinary Engineering; vol. 2 (2015). p. 288-297.
Kuster, C. et. al. "FreeCam: A Hybrid Camera System for Interactive Free-Viewpoint Video". Vision, Modeling, and Visulization, (2011), 8 pages.
Boyle, M., et. al., "The Effects of Filtered Video on Awareness and Privacy". In Proceedings of the ACM conference on Computer supported cooperative work (CSCW '00), (2000), 10 pages.
Milgram, P, et. al., "A Taxonomy of Mixed Reality Visual Displays", IEICE Transactions on Information Systems, vol. E77-D, No. 12, Dec. 1994, 15 pages.
Moons, T., et. al., "3D Reconstruction from Multiple Images Part 1: Principles", Foundations and Trends in Computer Graphics and Vision, vol. 4, No. 4. (2008), 113 pages.
Izadi, S., et. al., "KinectFusion: Real-time 3D reconstruction and interaction using a moving depth camera". Proceedings of the 24th annual ACM symposium on User interface software and technology ACM, Oct. 2011, pp. 559-568.
Kato, H., et. al., "Marker Tracking and HMD Calibration for a Video-Based Augmented Reality Conferencing System". Proceedings of the 2nd IEEE and ACM International Workshop on Augmented Reality '99, Oct. 20-21, 1999, pp. 85-94.
Klein, G., et. al., "Parallel Tracking and Mapping for Small AR Workspaces". Mixed and Augmented Reality, 2007. ISMAR 2007. 6th IEEE and ACM International Symposium, Nov. 2007, 10 pages.
Seitz, S. M., et. al., "A Comparison and Evaluation of Multi-View Stereo Reconstruction Algorithms". IEEE Computer Society Conference on Computer Vision and Pattern Recognition (CVPR'06), (2006) 8 pages.
Reitmayr, G., et. al., "Semi-Automatic Annotations in Unknown Environments". Proceedings of the 2007 6th IEEE and ACM International Symposium on Mixed and Augmented Reality, IEEE Computer Society, (2007), 4 pages.
Siltanen, S., et. al., "Automatic Marker Field Calibration". Proceedings of Virtual Reality International Conference (VRIC), Apr. 2007, 7 pages.
Brückner, M. et. al., "Active Self-calibration of Multi-camera Systems". Joint Pattern Recognition Symposium, Springer-Verlag Berlin Heidelberg, Sep. 2010, pp. 1-10.
Zhang, Z., "A Flexible New Technique for Camera Calibration". Microsoft Corporation, MSR-TR-98-71, last updated on Aug. 13, 2008, 22 pages.
Jun, J., et. al., "An Extended Marker-Based Tracking System for Augmented Reality". Second International Conference on Modeling, Simulation and Visualization Methods, (2010), pp. 94-97.
Siltanen, S., "Theory and Applications of Marker-Based Augmented Reality". VTT Science 3, Espoo, (2012), 246 pages.
Basso, F., et. al., "Online Calibration for Networks of Cameras and Depth Sensors", OMNIVIS: The 12th Workshop on Non-classical Cameras, Camera Networks and Omnidirectional Vision—2014 IEEE International Conference on Robotics and Automation (ICRA 2014), Jun. 2014, 6 pages.
Wikipedia, "Motion Estimation". Web Archive dated Nov. 8, 2015, at: https://web.archive.org/web/20151108162609/https://en.wikipedia.org/wiki/Motion_estimation, 2 pages.
Devincenzi, A. et. al., "Kinected Conference: Augmenting Video Imaging with Calibrated Depth and Audio". CSW 2011, Mar. 19-23, 2011. ACM 978-1-4503-0556-3/11/03, pp. 621-624.
Hubers, A. et. al. "Video Manipulation Techniques for the Protection of Privacy in Remote Presence Systems". ACM, Jan. 13, 2015. Available at: http://arxiv.org/pdf/1501.03188v1.pdf, 14 pages.
Dayrit, F., "Free-viewpoint Image Generation-based Human Motion Reenactment from a Single RGB-D Video Stream", Master's Thesis, Mar. 13, 2014. Available at: http://yokoya.naist.jp/paper/datas/1346/enzothesis.pdf, 54 pages.
Fuchs, H., et. al., "Virtual Space Teleconferencing using a Sea of Cameras". Proceedings First International Conference on Medical Robotics and Computer Assisted Surgery (vol. 26), Sep. 1994, 7 pages.

(56) References Cited

OTHER PUBLICATIONS

Henry, P., et. al., "RGB-D Mapping: Using Kinect-Style Depth Cameras for Dense 3D Modeling of Indoor Environments", The International Journal of Robotics Research, The Author's (2012), 17 pages.

Baričević, D., et. al., "A Hand-Held AR Magic Lens with User-Perspective Rendering". 2012 IEEE International Symposium on Mixed and Augmented Reality (ISMAR) (2012), 10 pages.

Kantonen, T., et. al., "Mixed Reality in Virtual World Teleconferencing", IEEE Virtual Reality 2010, Mar. 2010, pp. 179-182.

3DPresence, "Specification of Multi-View Acquisition System, Version 1.0". Deliverable D1.1, Network Media, (2007), pp. 1-48.

Wang, J., et. al., "An Augmented Reality Based System for Remote Collaborative Maintenance Instruction of Complex Products". 2014 IEEE International Conference on Automation Science and Engineering (CASE), (2014), pp. 309-314.

Kim, S., et. al., "Improving co-presence with augmented visual communication cues for sharing experience through video conference," 2014 IEEE International Symposium on Mixed and Augmented Reality (ISMAR), (2014), pp. 83-92.

Celozzi, C., et. al., "A 6-DOF ARTag-based tracking system". IEEE Transactions on Consumer Electronics, vol. 56, No. 1, Feb. 2010, pp. 203-210.

\* cited by examiner

APPARATUS AND METHOD FOR SUPPORTING INTERACTIVE AUGMENTED REALITY FUNCTIONALITIES

CROSS-REFERENCE TO RELATED APPLICATIONS

This application is a national stage application under 35 U.S.C. 371 of International Application No. PCT/US2017/024072, entitled APPARATUS AND METHOD FOR SUPPORTING INTERACTIVE AUGMENTED REALITY FUNCTIONALITIES, filed Mar. 24, 2017, which claims benefit under 35 U.S.C. § 119(e) from U.S. Provisional Patent Application Ser. No. 62/316,884, entitled "Apparatus and Method for Supporting Interactive Augmented Reality Functionalities," filed Apr. 1, 2016, incorporated herein by reference in its entirety.

BACKGROUND

Augmented Reality (AR) is a concept and a set of technologies for merging of real and virtual elements to produce new visualizations—typically video—where physical and digital objects co-exist and interact in real time. 3 dimensional (3D) models and animations are some examples of virtual elements that can be visualized in AR. However, AR objects can basically be any digital information for which spatiality (3D position and orientation in space) gives added value, for example pictures, videos, graphics, text, and audio.

AR visualizations typically include a means to display augmented virtual elements as a part of the physical view. AR visualizations may be implemented using for example a tablet with an embedded camera, which captures video from the user's environment and shows it together with virtual elements on its display. AR glasses, either video-see-through or optical-see-through, either monocular or stereoscopic, can also be used for viewing.

In AR, graphical tags, fiducials or markers have been commonly used for defining position, orientation and scale for AR objects. Graphical markers have certain advantages over the using of natural features. For example, graphical markers help to make the offline process for mixed reality content production and use more independent of the actual target environment. This allows content to be positioned more reliably in the target embodiment based on the position of graphical markers, whereas changes in the environment (e.g. changes in lighting or in the position of miscellaneous objects) can otherwise make it more difficult for an augmented reality system to consistently identify position and orientation information based only on the environment.

SUMMARY

This disclosure provides systems and methods for remote AR. The systems and methods disclosed herein provide for remotely augmenting environments that do not have graphical markers attached to their surfaces, where the augmentation is performed independent of a local user's assistance. Additionally, the interaction may be both synchronous and asynchronous, live video from the local site is used, and the local user's privacy is supported.

In accordance with at least one embodiment, the AR framework enables remote AR functionalities as add-on features to more conventional videoconferencing systems. Locally-captured 3D data can be combined with real-time video to support remote AR interaction. The 3D data is captured via a fixed local infrastructure that is configured to capture a 3D model of the environment. The 3D model is used by the remote participant to position the AR objects to desired positions. Portions of the local 3D data or side views (perspective videos) generated by the system are then transmitted in addition to the live video. In an exemplary embodiment, the portion of the 3D data or the corresponding side view that is sent for enabling remote AR is limited to the intersection of the 3D reconstructed local space and the view captured in the real-time video.

In accordance with at least one embodiment, spatiality is supported by providing users individual video based viewpoints and perspectives, utilizing a spatial augmented reality system. Remote 3D AR is enabled by with a spatial augmented reality system includes a 3D capture setup that is auto-calibrated with the user video terminal. Editing or viewing the AR content may be synchronous or non-synchronous (or off-line). The perspective videos reduce the bandwidth for transmitting the AR and video data. The spatial AR system is downward compatible with non-AR video conferencing systems. The spatial (awareness of viewpoints and orientations) awareness applies to both AR objects as well as other users. The spatial awareness may also be supported for audio, as well as video and 3D data. The location of the source of audio may be determined, and transmitted only if within an intersection of a viewing pyramid. The transmitted sound may include data regarding the directionality of the sounds for directional, stereo, or surround transmission at a remote end.

AR systems and methods are described for obtaining a 3D model of a physical location from a 3D-capture system comprising one or more 3D depth sensors disposed throughout the physical location, generating a truncated 3D model of the physical location, the truncated 3D model corresponding to the intersection of the generated 3D model and a field of view of a user terminal camera at the physical location, and transmitting the truncated 3D model to a remote location.

In some embodiments, the field of view of the user terminal camera is determined at least in part by identifying image data related to positions of markers in the physical location and using the positions to determine the field of view of the user terminal camera.

In some embodiments, a display device at the remote location displays an arbitrary view point of the truncated 3D model including rendered objects only within a field of view of the user terminal camera.

In some embodiments, the method further includes receiving location information for placing a virtual object in the 3D model of the physical location. In some embodiments, the location information corresponds to a location in the physical location inside the truncated 3D model. In some embodiments, the location information corresponds to a location in the physical location outside the truncated 3D model. In some embodiments, the method further includes obtaining a 3D model of the virtual object from a database. In some embodiments, the method further includes receiving a 3D model of the virtual object from the remote location.

In some embodiments, the method further includes receiving a virtual camera control command from the remote location, and responsively generating a corresponding perspective view of the truncated 3D model.

In some embodiments, the method further includes generating a second truncated 3D model corresponding to the intersection of the generated 3D model and a second field of view of a second user terminal camera at the physical location and transmitting the second truncated 3D model to a second remote location.

DETAILED DESCRIPTION

Figure 1:
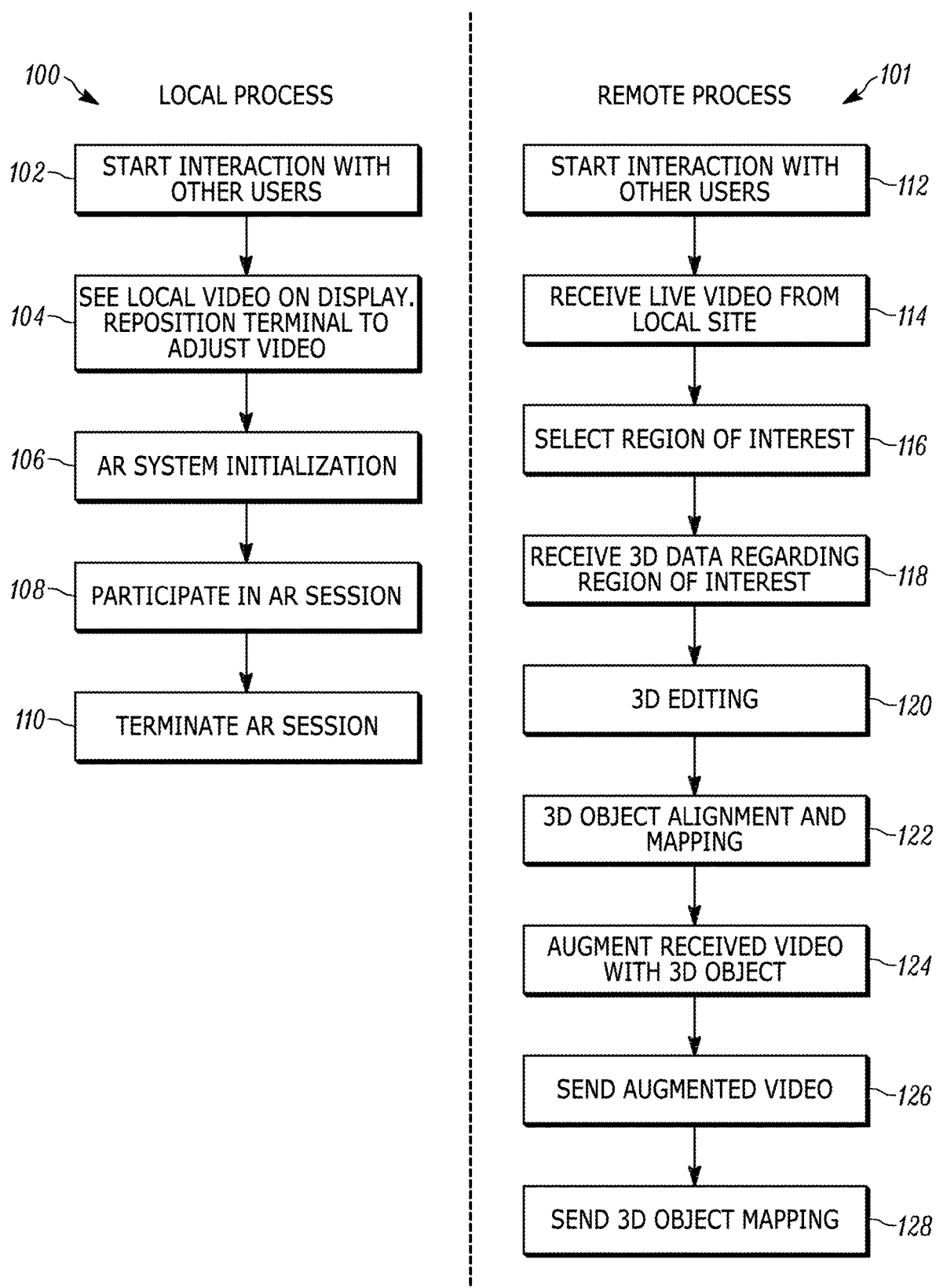
FIG. 1 depicts an example method, in accordance with at least one embodiment.

This disclosure teaches a framework for remote AR. The framework provides for remotely augmenting environments independent of a local user's assistance. In some embodiments, the environments being augmented do not have graphical markers attached to their surfaces. Additionally, the interaction may be both synchronous and asynchronous, live video from the local site is used, and the local user's privacy is supported.

In accordance with at least one embodiment, the AR framework enables remote AR functionalities as add-on features to more conventional videoconferencing systems. Locally-captured 3D data is combined with real-time video to support remote AR interaction. The 3D data is captured via a fixed local infrastructure that is configured to capture and deliver a 3D model of the environment. Portions of the local 3D data are then transmitted in addition to the live video. The portion of the 3D data that is sent for enabling remote AR is limited to the intersection of the 3D reconstructed local space, and the outgoing video view.

AR visualizations can be seen correctly from different viewpoints, such that when the user changes his/her viewpoint, virtual elements stay or act as if they would part of the physical scene. AR tracking technologies are used to derive the 3D properties of the environment for AR content production, and when viewing the content, for tracking the viewer's (camera) position with respect to the environment.

In some embodiments, printed graphical markers are used in the environment, to be detected from a video as a reference for both augmenting virtual information in right orientation and scale, and for tracking the viewer's (camera) position. In other embodiments, markerless AR can be used to avoid the potential disruption of physical markers. Markerless AR relies on detecting distinctive features of the environment and using them for augmenting virtual information and tracking user's position.

Some AR applications are meant for local viewing of the AR content, where the user is also in the space which has been augmented. However, as the result is typically shown as a video on a display, it can also be seen remotely over network, if wanted.

Producing AR content remotely—e.g. augmenting virtual objects and animations over network—is useful feature in many applications, for example: remote maintenance and consultancy. One area addressed herein is delivery of virtual objects in telepresence and social media applications. Telepresence applications make use of synchronous interaction between two or more users, both content producer(s) and consumer(s).

In embodiments with synchronous interaction, remote and local users have a common video conference and see the virtual objects that are added to the video stream in the real time. Synchronous interaction may have two or more users interact in real time, or close to real time ("on-line"), for example using audio and video. For many applications, including those supporting real time AR interaction, the bandwidth, processing time, small latency, etc. may be demanding.

In embodiments with asynchronous communication the participants have 3D models of the environments available at a later time, and can add virtual objects there, and other participants can see them when accessing the model. Asynchronous interactions deliver and share information, for example messages, audio, and images, without hard real-time constraints. In many cases asynchronous interaction is preferred as it does not require simultaneous presence from the interacting parties.

In many applications, supporting synchronous and asynchronous functionalities in parallel or in series is beneficial. Synchronous and asynchronous functionalities can also be mixed in more integral way in order to create new ways of interactions.

If graphical markers are attached to the local environment, remote augmentation can be performed by detecting markers' position, orientation and scale (pose) from the received local video, and aligning virtual objects with respect to the markers. This method may be partly automated and is suitable for unplanned synchronous interactions.

In embodiments that are unassisted, the interaction either does not need or allow assistance by a local user. In embodiments that are assisted, interaction includes assistance by the local user, but can after that be used both for asynchronous or synchronous (real-time) interactions.

Markerless 3D-feature-based methods can be used in cases when visible markers are too disruptive or do not work at all, like in large scale augmentations outdoors. They can generally be made more accurate, robust and wide base than marker-based methods. Feature-based methods, like those based on point-clouds of features, may utilize more advance preparations than marker-based methods, may utilize more complex data capture, may involve complex processing, and may utilize more complex tools for AR content production compared to marker based approach. In addition, they may not provide scale reference for the augmentations as when using markers.

Although feature-based methods may utilize advance preparations, they can also be used for augmenting spaces remotely, where users can perform the preparations, and where the local environment stays stable enough so that the results of those preparations can be used repeatedly, in several synchronous sessions. In these solutions, 3D scanning of the local space can be made by using a moving camera or a depth sensor—with the latter also to some extent in a fixed setup.

Marker-based methods can be applied even if there are no predefined markers in the local environment. In this approach, the application offers a user interface for selecting a known feature set (e.g. poster in the wall or a logo of machine) from the local environment. This set of features used for tracking is in practice an image that can be used in lieu of a formal marker to define 3D location and 3D orientation.

With restrictions, even unknown planar features (those recognized and defined objectively by the remote user) can be used for augmentation. In these embodiments, however, the depth and scale may not be able to be derived accurately from the remote video, and the augmentation is restricted to replacing planar feature sets with other subjectively scaled planar objects (e.g. a poster with another poster).

Generic and precise 3D tracking of features may be used in embodiment of synchronous remote AR. For example, in a local environment that has no features that are known in advance, simultaneous localization and mapping (SLAM) may be used. These methods simultaneously estimate the 3D pose of the camera and 3D features of the scene from a live video stream. SLAM results in a set of 3D points, which can be used by a remote user to align virtual objects to a desired 3D position.

Local 3D features can also be captured with a set of fixed video cameras, each filming the environment from different angles. These streams can be used to calculate a set of 3D points that can be used by the remote user.

Optionally, the above described 3D point set can be created by using depth camera. For making the point cloud, related camera and/or depth sensor based solutions described for 3D telepresence are also applicable.

In accordance with at least one embodiment, local assistance is not needed when using fixed instrumentation for 3D data captures. Current solutions for feature based AR do not serve well in this respect, and new solutions would be beneficial.

Capturing local space in real-time without preparation or assistance may be performed by a fixed setup of 3D cameras and/or sensors, and this information may be provided to a remote user to make accurate 3D augmentations. Note that this choice may preclude the use of most common methods for 3D feature capture, namely those based on a single moving camera or depth sensor, to the extent such methods are not adapted for real-time capture. Examples include SLAM and Kinect Fusion algorithms. Examples of techniques that can be used to capture a local environment using point cloud data include, for example, the algorithms available through the Point Cloud Library maintained by Open Perception.

In accordance with some embodiments, local assistance in 3D feature capture is not used, and thus methods based on moving a single camera or depth sensor in space may not be used to meet the real-time constraints. One solution for real-time unassisted 3D capture for use in real-time 3D telepresence may be accomplished with multi-sensor capture that is typically used for deriving a 3D representation of the captured scene. In accordance with at least one embodiment, the multi-camera setup is calibrated using markers. The calibration method includes: (i) printing a pattern and attaching it to a planar surface, (ii) capturing multiple images of the model plane under different orientations by moving either the plane or the camera, (iii) detecting the feature points in the images, (iv) estimating five intrinsic parameters and all extrinsic parameters using a close-form solution, (v) estimating the coefficients of the radial distortion by solving the linear least-squares, and (vi) refining parameters via a minimizing equation.

A distributed multi-camera or multi-sensor system is calibrated to ensure a common understanding of the 3D features they are capturing. In determining an intersection of a viewing pyramid as captured by a camera on a terminal device and a 3D data of a space, the terminal device is calibrated with the multi-camera system. The calibration may be based on electronic markers due to the simplicity of marker based calibration.

The coding and transmission of real-time captured 3D data may utilize more bandwidth than real-time video. For example, raw data bitrate of a Kinect 1 sensor is almost 300 MB/s (9.83 MB per frame), making efficient compression methods desirable. Compression methods for Kinect type of depth data (either RGB-D or ToF) are however still in their infancy.

In at least one embodiment, the medium between participants is via remote AR interaction, using real-time video, either as such or augmented.

A distributed multi-camera or sensor system is first calibrated to have a common understanding of 3D features they are capturing. This is a demanding process, and prone to different kinds of errors, depending on sensor type, amount, and positions.

The disclosed principle of forming the intersection of 3D capture and the video view does not make specific assumptions for the sensor system or its calibration scheme. A special feature of the disclosed system is that the camera of the user's interaction device (laptop, tablet, or alike) has to be calibrated.

Some feature-based AR solutions are not suited well to support remote AR in unassisted synchronous settings. In many cases for remote AR, a local user can assist scanning of the environment with a moving sensor. This type of in advance preparations are not however always possible or desirable.

In some embodiments that permit remote augmentation of a local space, graphical markers are not attached and no advanced preparations are required. This is possible even in unassisted synchronous interaction based on real-time video connection, if enough image data and/or 3D information about the space is captured in real-time and provided to the remote site.

Supporting user privacy is advantageous for social networking services, which reach to peoples' homes, workplaces or other private premises. Some privacy controls permit the local user control over what data a remote user receives, from visual data seen by the remote user or 3D data transmitted to the remote user. Privacy is desired when fixed instrumentation of cameras are used to capture 3D data in a private place such as user's homes.

Trust for privacy is an important factor in user acceptance for a service or system. However, using 3D capture for interaction includes user acceptance also in more broad sense. The system set-up should be easy and unobtrusive enough, and the service should fit in existing trusted ways of communication and interaction.

In order to enable remote 3D augmentation, enough 3D information is captured and sent from the local environment. The amount of information transmitted is a tradeoff between bitrate, accuracy, and ease-of-use in AR content production. Bitrate is naturally also affected by the coding and transmission scheme used for the outgoing 3D data.

A remote AR system benefits from support for producing AR content. Both in marker based and markerless (feature based) methods, viewing the marker or captured scene from different viewpoints is helpful when deciding on the 3D position for the augmentation. Especially when using 3D features—e.g. in the form of a 3D point-cloud—clarity, speed, and ease-of-use are not easy to achieve in AR content production.

In at least one embodiment of a remote AR system, (i) support is provided for remotely augmenting environments, which do not have graphical markers attached to their surfaces, (ii) a local user is not required to assist the augmentation process, (iii) the AR interactions are able to be synchronous or asynchronous, (iv) live video from the local site is transmitted, and (v) the local user's privacy is preserved.

In at least one embodiment, an intersection of 3D data and real-time video is determined. In such at least one embodiment, the additional 3D information sent for enabling remote AR is limited to the intersection of (i) the 3D reconstructed local space, and (ii) the outgoing video view. The intersection is defined geometrically by a viewing pyramid (which may be a substantially rectangular viewing pyramid) opening towards the local space, along the camera's viewing direction, with the apex of the pyramid behind the camera lens. The pyramid of vision may be truncated by e.g. parallel planes limiting 3D shapes assumed to be too near or far from camera. A natural truncation boundary is formed by the far end of the volume of the 3D reconstructed local space. Viewing pyramids refer to a pyramid with rectangular or any other cross section shape.

In an exemplary embodiment, the video connection is the primary means for real-time communication in the system. People are already very much accustomed to use it, and have accepted to show part of their surroundings—even at home—for a number of their friends and contacts. When using video, users have a good understanding and control of what they show to outside. Typically they pay attention to the video content before joining to a video meeting, when choosing their position and outgoing view. The real-time video is used for communication, and at the same time defines the part of user's space available both for producing (binding) and receiving 3D augmentations.

An exemplary embodiment of the disclosure operates to restrict the outgoing 3D information to the intersection of the 3D reconstruction and the real-time video view. In addition to privacy needs, this principle serves also in limiting the amount of bits for transmitting 3D information for remote 3D augmentation. The amount of transmitted bits is smaller for the intersection compared to the complete 3D reconstruction.

FIG. 1 depicts an example method, in accordance with at least one embodiment. The example method is divided among steps taken at a local user and at remote participants.

In the local process 100, the local user starts, or joins, an interactive session 102 with remote participants. Before video is transmitted from the local user to the remote participants, the user can see what is visible from local user's terminal device 104, which may be any device suitable for use in AR systems, such as smart phones, tablet computers, laptop computers, camera accessories, and the like. The user is able to reposition the terminal device, ensuring that only non-sensitive or non-private information is visible in the viewing pyramid. The AR system and terminal then initialize 106, which may include performing a calibration, locating the video terminal, making a 3D capture, and determining an intersection of the 3D capture and the viewing pyramid. The initialization process may be repeated if the terminal device is moved or repositioned. The user may then participate 108 in the AR session with the remote participants. User participation may include viewing augmentations in the local space produced by the local user or the remote participants, creating remote AR content to the other peers, and the like, until the AR session is terminated 110.

In the remote process 101, the remote participant starts, or joins, an interactive session with the local participants 112. The remote participant receives 114 live video from the local site. The remote participant can select 116 an area, or region, of interest from the received live video and receives 118 3D data regarding the features associated with the region of interest. A 3D editor may be used 120 to edit 3D objects into the 3D data. The 3D objects are aligned 122 with respect to the 3D data, or 3D feature sets, and a mapping between the 3D objects and 3D data is created. Using the alignment mapping, the received video is augmented 124 with the 3D objects, displayed in the desired position. The augmented video is transmitted 126 to a far end, along with the mapping 128 between the 3D object location and the 3D feature points to the far end.

In at least one embodiment, there is no need for graphical markers. The AR system enables 3D feature based AR from the real-time video connections.

In at least one embodiment, local preparation and local user assistance is not required for AR sessions. The AR system is based on using a distributed real-time 3D capture setup. The AR session may determine the intersection of the live-video and the 3D data live or off-line with 3D reconstruction calibrated with the camera view.

In at least one embodiment, user privacy is maintained by adjusting the real-time video view, such that the user has control over what 3D information is transmitted based on controlling the viewing pyramid.

In at least one embodiment, the user acceptance and service take-up permits value-add features to the video functions.

In at least one embodiment, non-symmetrical use cases are supported with remote participants not required to have the 3D capture setup installed in order to make augmentations in the local scene.

In at least one embodiment, bitrates of transmitted data are reduced by using perspective videos, as compared to sending real-time 3D information.

In at least one embodiment, the ease-of-use of AR content production is increased by providing 3D intersection data to the remote user to make 3D augmentations to correct areas in the received video.

Figure 2:
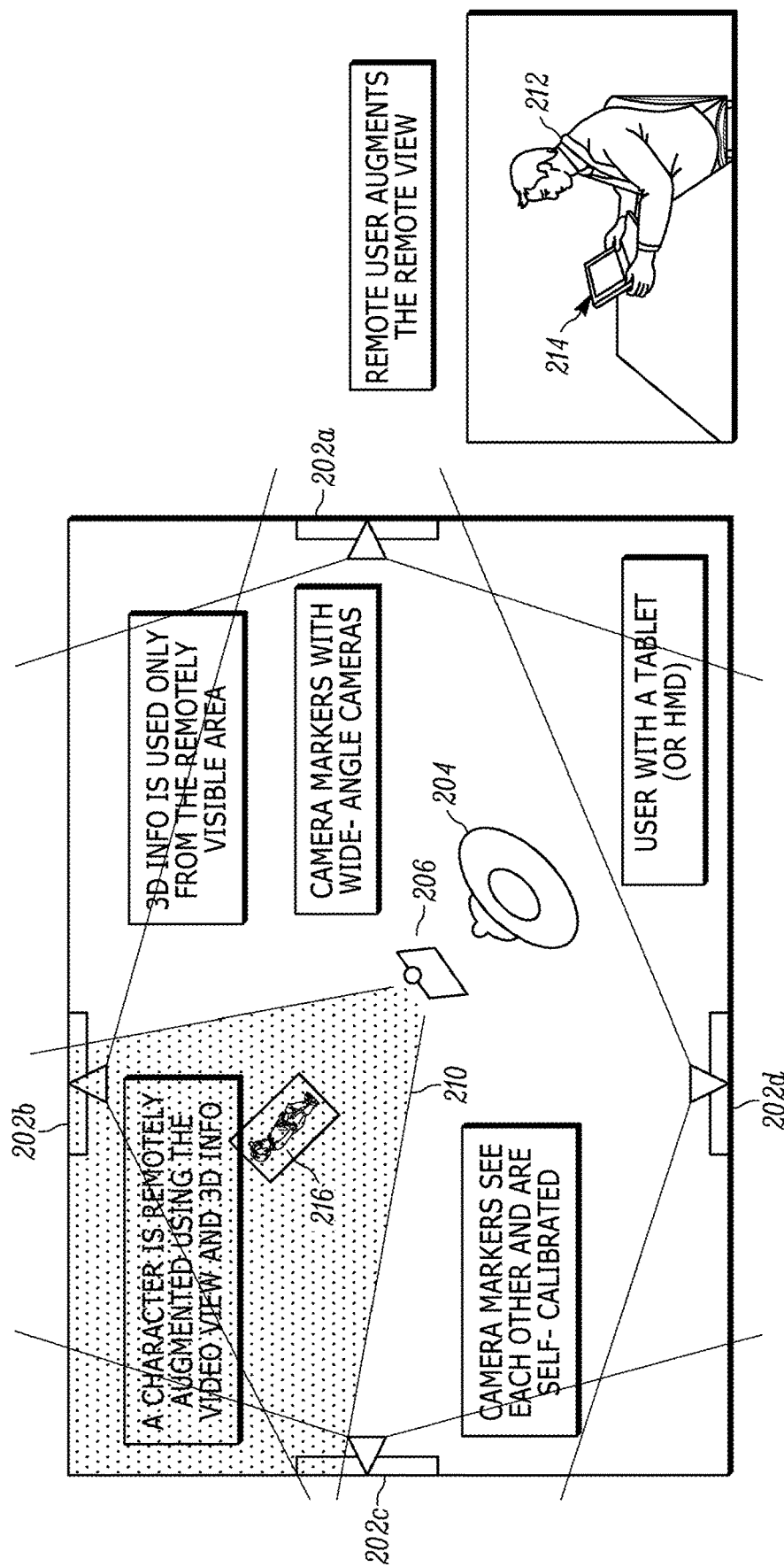
FIG. 2 depicts an example AR system, in accordance with at least one embodiment.

FIG. 2 depicts an example AR system, in accordance with at least one embodiment. The AR system in FIG. 2 may be used for 3D capture and reconstruction. While FIG. 2 depicts one system, other alternative systems may be used as well.

In the AR system of FIG. 2, a set of multiple camera markers 202a/202b/202c/202d may be used for a full 3D reconstruction of the local environment. The camera markers are visible to each other and may be self-calibrated. The camera markers may also be equipped with wide-angle cameras. The camera markers may further include electronic pan-tilt-zoom and a display. A user 204 with a user terminal device 206, shown as a tablet having a camera on the opposing side of the display, or a head mounted display, captures a video stream from the viewing pyramid 210, indicated by the dotted triangle extended to the top left from the user's terminal device 206. Markers 202a/202b/202c/202d may be used on the device display for automated self-calibration of the distributed setup. Only a truncated 3D model is transmitted, the truncated 3D model representing an intersection of the full set of 3D information (also referred to herein as 3D models and 3D captures) and a field of view of the user terminal device. As shown, a character 216 is remotely augmented using the video and truncated 3D model. The AR visualization may be viewed by a remote user 212 on a laptop computer 214, or other suitable AR viewing device.

Figure 3:
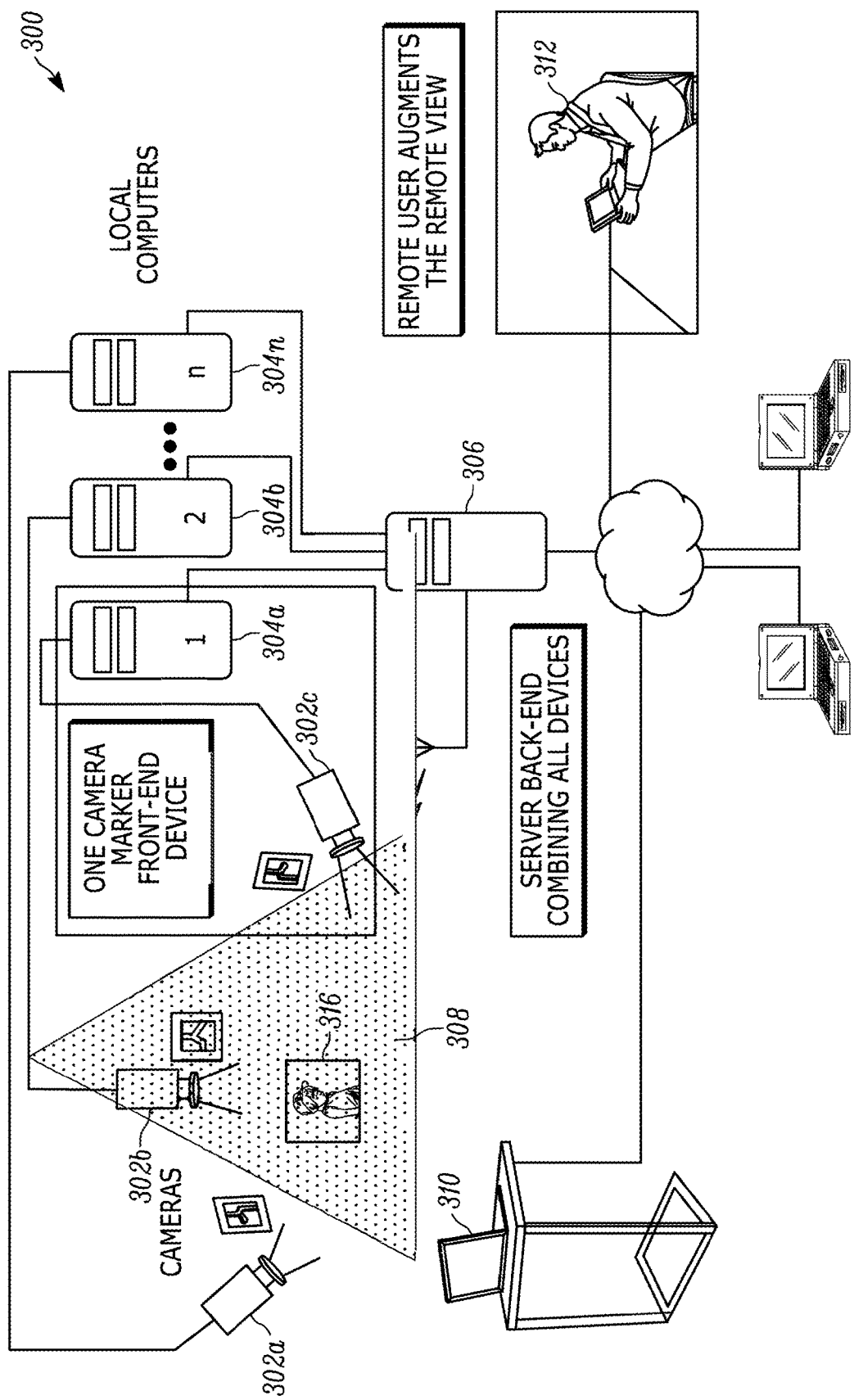
FIG. 3 depicts an example camera-marker-based 3D capturing system setup.

FIG. 3 depicts an example camera marker based 3D capturing system setup 300. In the example system setup, a plurality of 3D depth sensors (shown as cameras 302a/302b/302c) is configured in an array to collect 3D information of the scene used for generating a 3D model. Each of the cameras is communicatively coupled with local computers 304a/304b/ . . . /304n and transmits data to a back-end server 306 to combine information from each 3D depth sensor in the plurality of 3D cameras. One of the cameras is a front-end device. A laptop terminal device 310 may be equipped with a visible-light camera for capturing video of a field of view 308 of the laptop terminal 310. The remote user 312 receives video data representative of the field of view and a truncated 3D model from the intersection of the complete 3D model and the field of view of the laptop terminal 306. In some embodiments, the remote user 312 is permitted to augment the remote view, shown for example, adding augmented character 316 or other augmented object.

Figure 4A:
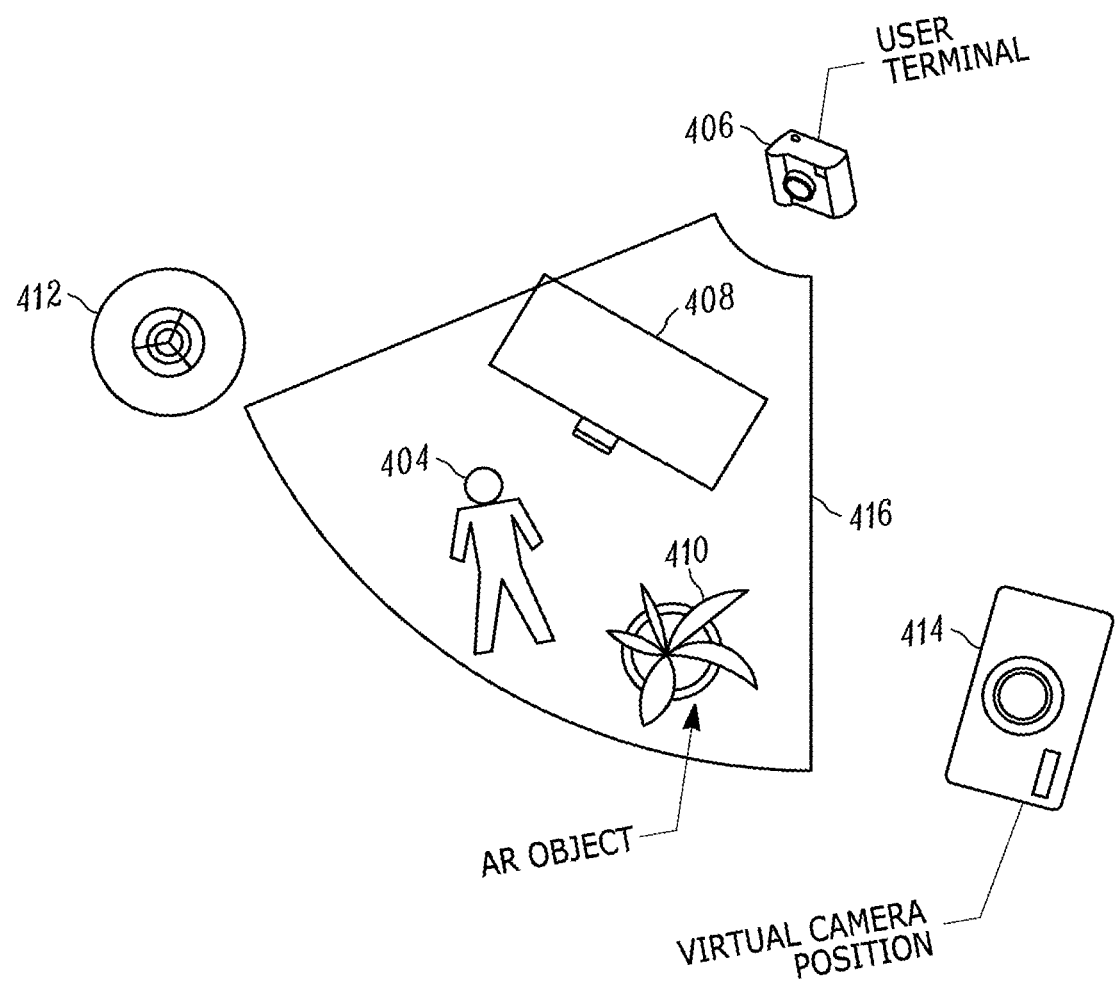
FIG. 4A depicts an overhead view of a physical location, in accordance with at least one embodiment.

FIG. 4A depicts an overhead view of a physical location, in accordance with at least one embodiment. The overhead view includes a user terminal 406, a desk 408, a user 404, an AR object 410 (such as the AR plant illustrated in FIG. 4A), a lamp 412, and a position of a virtual camera 414. In FIG. 4A, the user terminal 406 is depicted as a camera. The volume within the physical location that falls within a field of view of the user terminal camera may be described as a viewing pyramid 416. A video camera of the user terminal 406 is configured to capture video images of areas within a field of view of the video camera, the field of view illustrated by viewing pyramid 416. Inside the viewing pyramid is the desk 408, the user 404, and the AR object plant 410. Outside of the viewing pyramid 416, to the left side of the drawing, is the lamp 412. The area depicted in FIG. 4A may be used in an AR session. A 3D model may be generated using 3D data obtained from a 3D capture system of the complete area (including the lamp 412). In some embodiments, a truncated 3D model is transmitted to a remote user representing the intersection of the field of view of the user terminal camera and the generated 3D model.

Figure 4B:
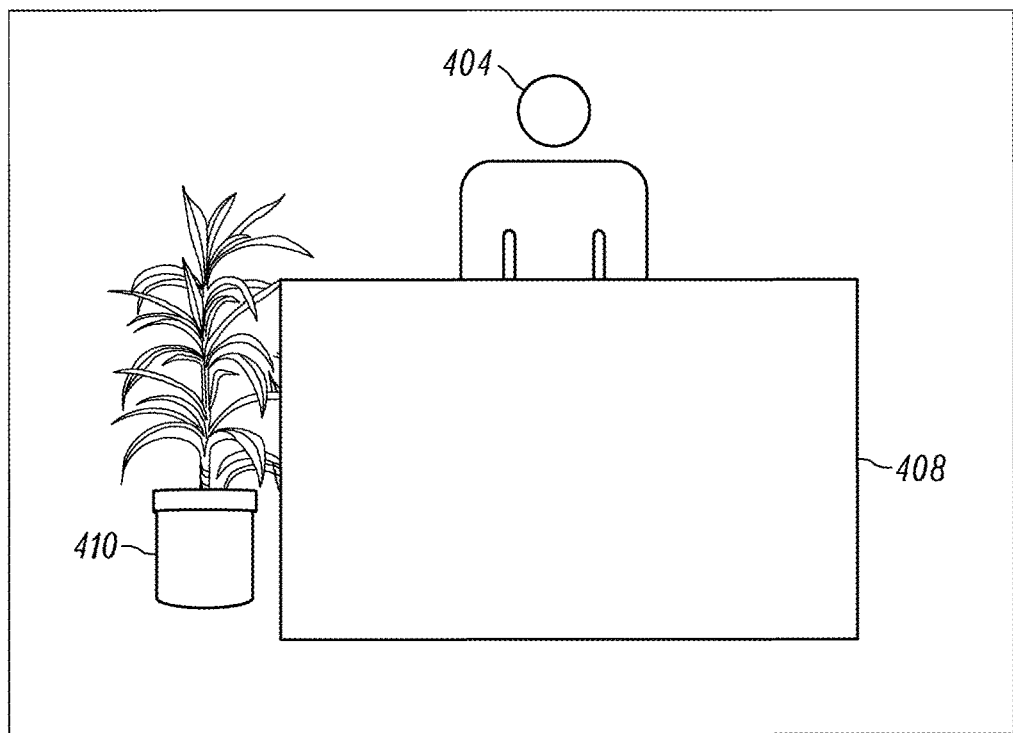
FIG. 4B depicts a perspective view from a user terminal, in accordance with at least one embodiment.

FIG. 4B depicts a perspective view from a user terminal, 406 in accordance with at least one embodiment. The AR scene may be rendered in a perspective view to a remote user. The perspective view depicted in FIG. 4B comprises the video stream captured from the user terminal 406, truncated 3D model from the intersection of the viewing pyramid 416 and the full 3D model, and AR objects 410 placed within the AR scene. As shown in FIG. 4B, the view only includes the desk 408, the user 404, and the AR object plant 410, and does not include the lamp 412, as the lamp 412 is outside of the viewing pyramid 416 and not in the intersection.

The orientation of the objects is taken from the perspective view of the user terminal 406, with the desk 408 in front of the user 404, and the plant 410 visually to the left of the user 404, and partially behind the desk 408.

Figure 4C:
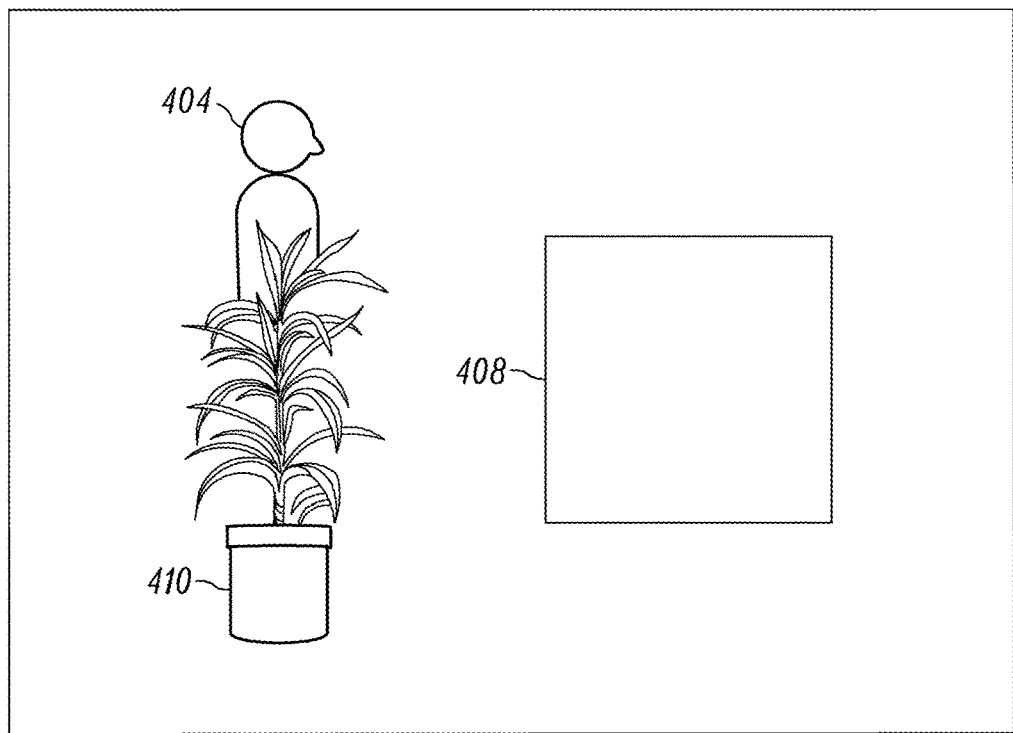
FIG. 4C depicts a perspective view from a virtual camera, in accordance with at least one embodiment.

FIG. 4C depicts a perspective view from virtual camera 414 of FIG. 4A, in accordance with at least one embodiment. In some embodiments, the remote user displays the AR scene from the vantage point of a virtual camera 414. As shown in FIG. 4A, the virtual camera 414 is placed to the side of the overhead view, and thus provides a different perspective from the physical video camera of the user terminal 406. The perspective view from the virtual camera similarly includes the desk 408, the user 404, and the AR virtual object plant 410. While the lamp 412 might in theory be visible to a physical camera at the location of the virtual camera 414, the lamp 412 is not included in the perspective view of the virtual camera 414 because the lamp 412 is outside of the viewing pyramid 416 of the video camera of the user terminal 406, with the video camera of the user terminal 406 operating as a model-extent-setting camera. In some embodiments, only the perspective view from the virtual camera 414 is sent to the remote user (in, for example, any one of several available formats for transmission of live video), thereby requiring a lower data rate than sending the entirety of the 3D model to the remote user. The remote user may send to the local user information representing coordinates (e.g. location, direction, and any roll/tilt/zoom parameters) of the virtual camera 414 within the local physical location, and the local user terminal 406 may generate the appropriate perspective view to send to the remote user. The remote user may be able to change the coordinates of the virtual camera 414 in real time.

The orientation of the objects is rendered from the perspective of the virtual camera 414, and thus, the user 404 is behind the virtual object plant 410, and the desk 408 is visually to the right of the virtual object plant 410 and user 404. Since the user 404 is behind the virtual object plant 410, the plant obscures portions the user.

Figure 4D:
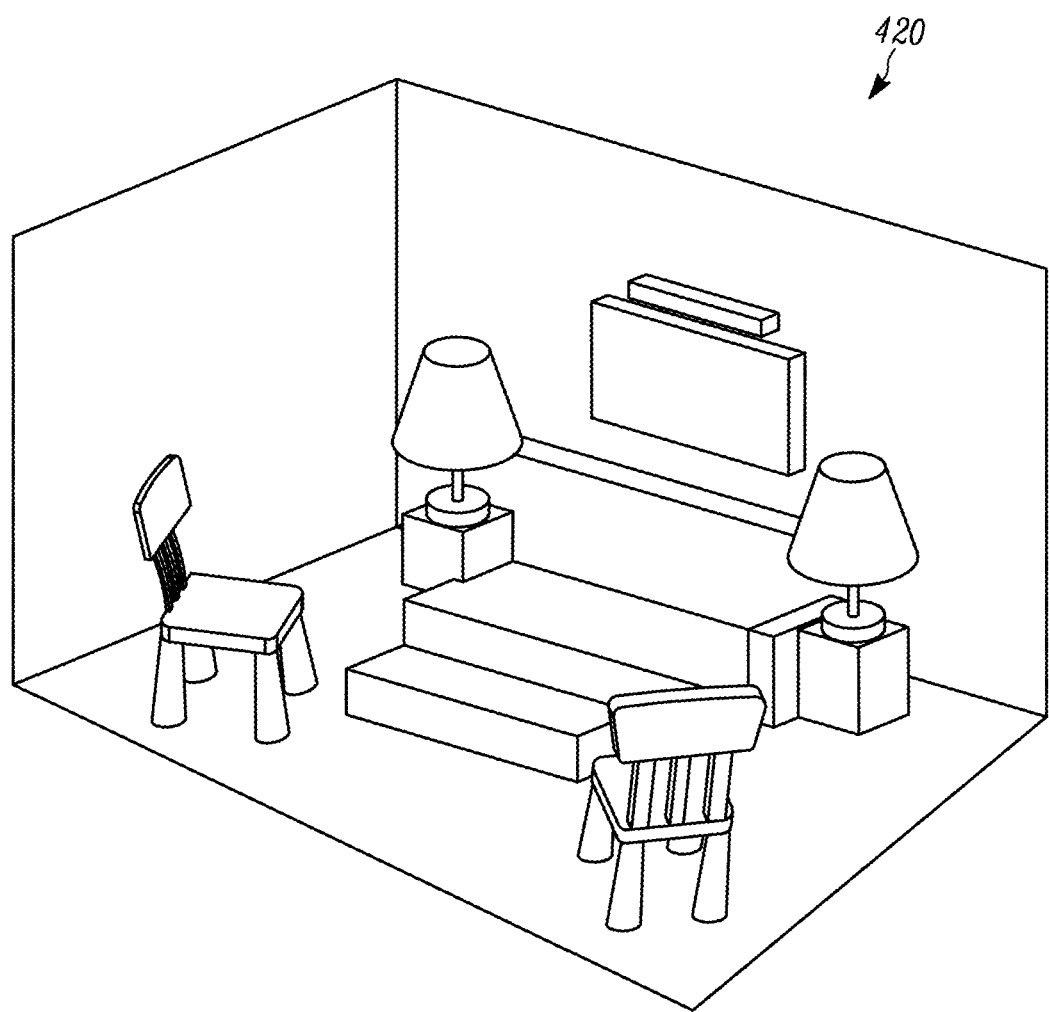
FIGS. 4D-4F depict steps of obtaining an intersection of a viewing pyramid and 3D information, in accordance with at least one embodiment.
Figure 4E:
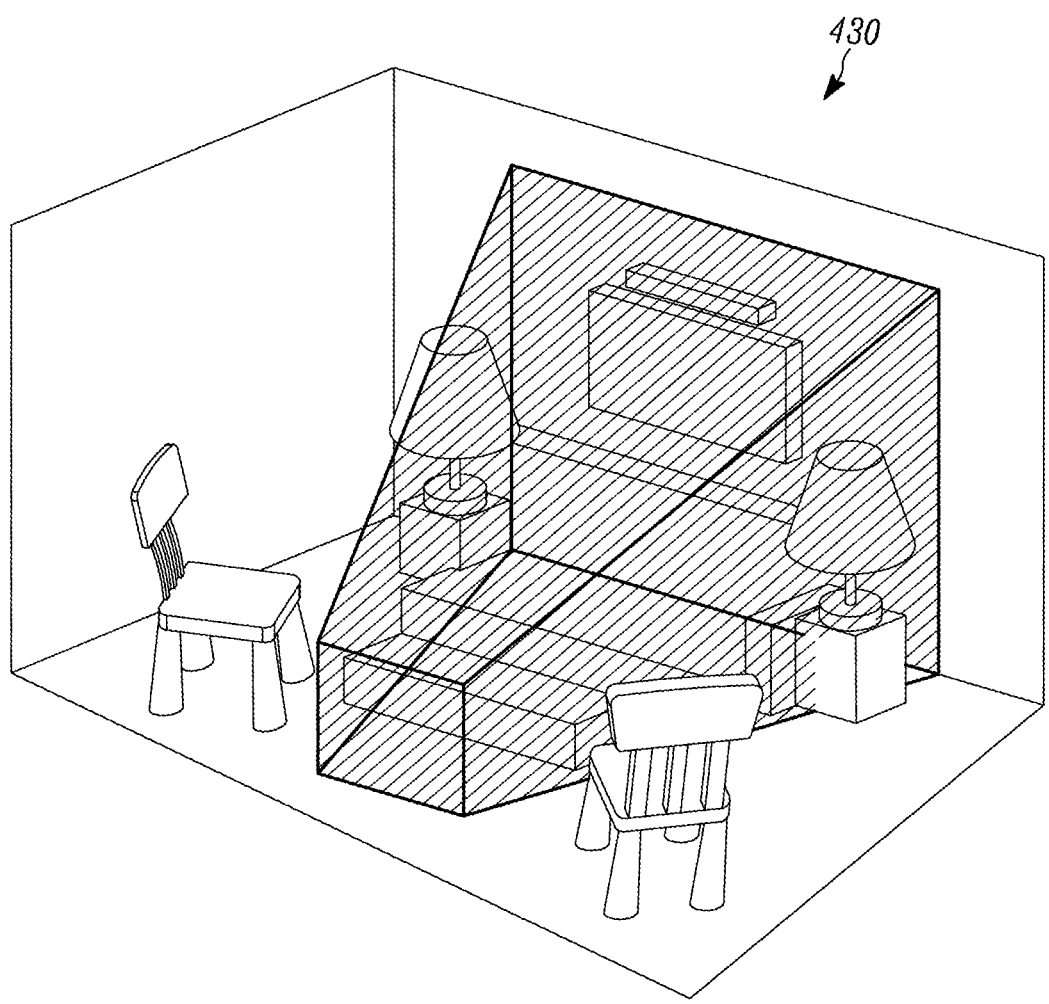
Figure 4F:
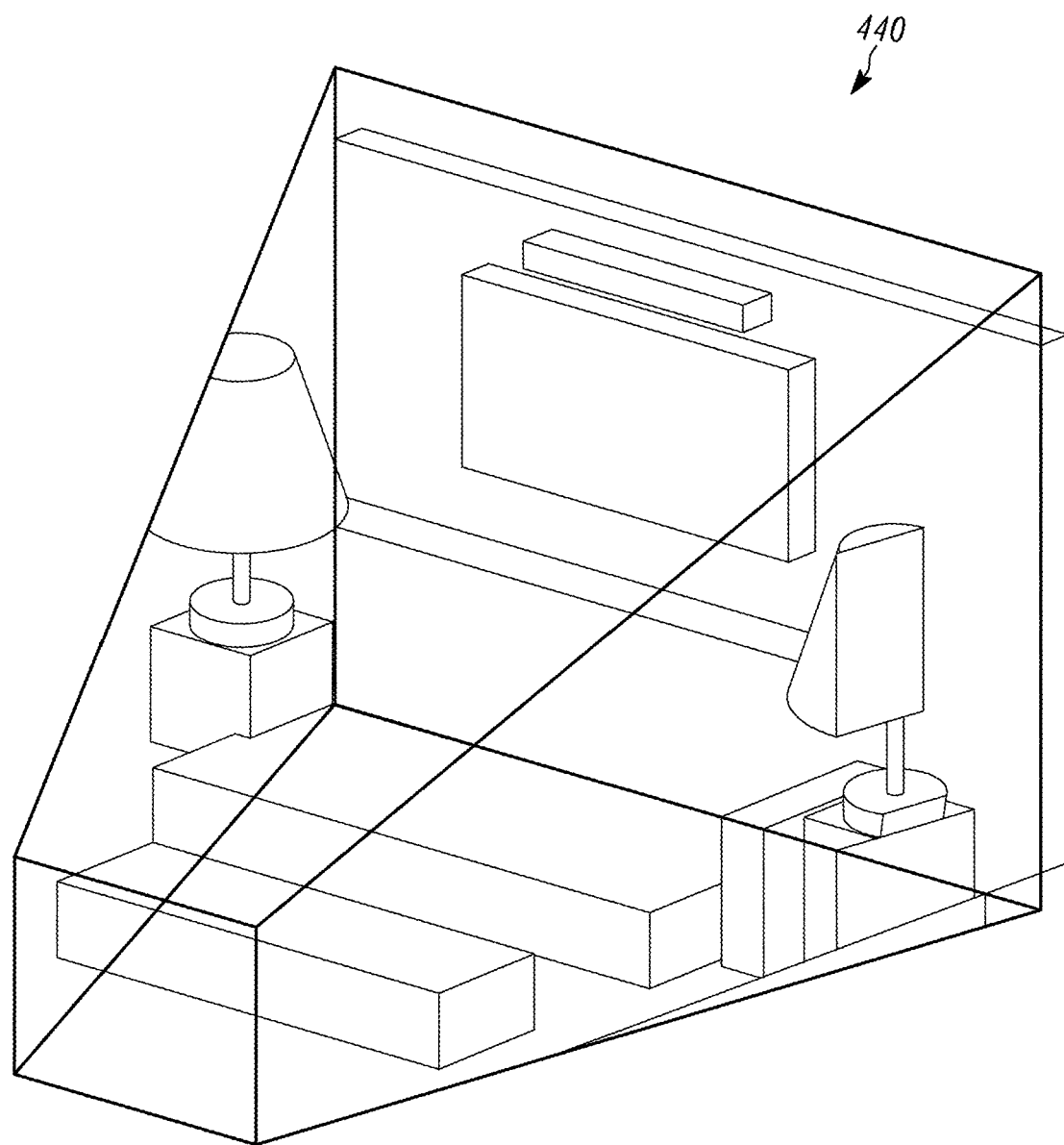

FIGS. 4D-4F illustrate various steps of obtaining an intersection of a field of view of a user terminal camera and a full 3D model, in accordance with some embodiments. FIG. 4D illustrates the full 3D model of a room 420. FIG. 4E illustrates a field of view 430 of a user terminal camera in the room (not shown). In FIG. 4E, the field of view is a shown as a viewing pyramid, however alternative shapes of a field of view may also be utilized. FIG. 4F illustrates the intersection 440 of the field of view of the user terminal camera and the full 3D model. In the example intersection, a 3D space is the intersection of a complete room model and a field of view of a camera, which may take the form of a 3D pyramid specified by the real-time camera position and properties. The intersection is thus a truncated 3D reconstruction (3D model) of the space appearing in the remote video view and thus is a part of the more complete 3D reconstruction made by the infrastructure.

While above embodiments only transmit the 3D truncated model to reduce bandwidth, it should be noted that further location information may be provided to remote users. For example, even though a remote user only receives the truncated 3D model, the remote user may also receive dimensions of the room, and in further embodiments, information illustrating to the remote user which area of the room corresponds to the truncated 3D model. In such embodiments, the remote user may augment objects to the local user in areas that are outside of the truncated 3D model, even though the remote user did not receive the full 3D model. In some embodiments, the remote user provides coordinates for the augmented object according to the received location information.

In accordance with at least one embodiment, the position and properties (e.g. camera model) of the physical camera define the solid angle inside the 3D reconstruction. The user's camera is calibrated with the system, and its position is detected and tracked during the interaction.

In embodiments that transmit only the truncated 3D model representing the intersection of the 3D information with the field of view of the user terminal, the bitrate is reduced as compared to embodiments that transmit complete 3D information and video information. The amount of data transmitted may be further reduced in embodiments where the local user is able to define forbidden, or exclusion, zones inside the local space. The bitrate may also be reduced by coding and transmission schemes selected. 3D information from within the forbidden zones are not included in the transmissions, even if the forbidden zones are within the viewing pyramid.

In accordance with at least one embodiment, the local user may perform the role of the remote augmentor. One example of a use case that does not control 3D data is when the local user augments the local environment for local use. This may be used when a user is utilizing AR to visualize furniture purchases, or repositioning, inside of his own home or office. Another example includes preparing a 3D data capture of the whole space beforehand, but when interacting with remote users, the content published outside is limited according to the disclosed principle of those areas and objects in the intersection of the real-time video and the 3D data capture.

In an example use case, a local user and a remote user are having an extended video conference using an AR system. Both the local and remote users have a respective AR system in each of their apartments. The local user has a pile of laundry in the corner of his room and (s)he has pointed the camera so that the remote user cannot see the pile in the video stream.

The remote user has a 3D model of a piece of furniture (s)he thinks looks good in the local user's environment. The remote user selects a position where (s)he wants to add the furniture model, by pointing on the video view coming from the local user's apartment. Next (s)he selects side view(s) of the local user's environment in order to position the 3D model of the furniture more precisely into a correct position. Even though the system creates a full 3D model of the whole room, the remote user cannot see the pile of laundry in any of the side views, because the system shows only those objects that are included in the main video view.

Both users can see the furniture model augmented to the video stream from the local user's environment. In addition, the local user can see the augmented furniture from different viewpoints using AR glasses. In some embodiments, the furniture is automatically scaled to right size due to system self-calibration, and the augmented furniture looks natural in its environment.

When the conference ends, a 3D model of the local user's environment is stored into a server. The remote user goes to a furniture store and sees even more interesting furniture. (S)he gets the 3D model of the new furniture and now, using a mobile terminal, replaces the earlier-placed augmented furniture in the local user's stored environment on the server.

The local user can see the additions with his/her mobile terminal, using a 3D browser while located outside the local user's environment. Finally, when the local user returns home, (s)he can see the new furniture augmented into the video view, and it is available for discussing by the parties when they have their next video conference.

Other example use cases include and embodiments may be used in the following environments: Video transmission and videoconferencing products manufacturers, service providers; Providers for telepresence products and services; Social platform and service providers; Consumers as users of communication and interaction products and services; Camera and sensor manufacturers; Companies specialized in supporting technologies for remote maintenance; Maintenance companies; Manufacturers of machineries with global operations; New players (manufacturers and service providers) specialized on supporting remote maintenance.

In some embodiments, the AR system may be supplemented with manual intervention and a priori preparations at the local site. This is applicable to the 3D scanning of the local environment by moving a camera or 3D sensor. The AR systems may also be supplemented with manual processing and transmission steps for 3D reconstruction.

In accordance with at least one embodiment, the scale is derived in feature-based AR systems. Images and videos from different viewpoints may be used for capturing the 3D shape of a target, but they may not reveal the scale of the object without knowing the position of the camera at the time the image was captures. The camera position may be determined by accelerometers and mobile device positioning systems (WiFi triangulation, and the like). In at least one embodiment, 3D sensors capture spatial features and derive the point cloud or 3D reconstruction. This provides an absolute scale, and can support self-calibration.

In embodiments where the user's terminal device is calibrated, it may be calibrated with the multi-sensor or multi-camera system. In such embodiments, the cameras may not be of the same type, make, and model, and the calibration includes collecting and using information on the properties of the cameras (e.g. focal length, charge-coupled device size and resolution, and other parameters used to convert between pixel data and real-world geometry.

In at least one embodiment, the multi-sensor based 3D capture system is calibrated with the real-time video. The 3D capture system uses a fixed local infrastructure, which captures and delivers local 3D properties, a 3D model of the environment, to enable accurate remote augmentation. This local 3D data can then be transmitted either as a part of live video streaming (synchronous interactions) or separately outside real-time encounters (asynchronous interactions).

In the disclosed system, multiple cameras or depth sensors are used to capture 3D data of the local environment. This data is provided to a remote user together with real-time video view of the local space. The video view is generated by the local user's terminal having a video camera and display, for example a laptop or a tablet.

A multi-camera or sensor system may be calibrated in order to create a common coordinate system for the whole setup, including user video terminal. An automated calibration process may be used. Marker based calibration of multiple wide angle cameras is enabled by associating those cameras with markers. The views of the marker cameras themselves are used for the mutual calibration of all devices, and the calibration can be updated when necessary, e.g. to adapt into any possible changes in the setup.

In accordance with at least one embodiment, calibration of the multi-camera systems is used to support the calibration and tracking of user video terminal. In the following, for simplicity, an exemplary embodiment is described with reference to at least one embodiment in which parties at two locations are in communication. The disclosed system can however be applied straightforwardly in embodiments in which multiple locations are in communication with one another.

In accordance with at least one embodiment, a distributed and local 3D reconstruction system is used. The 3D reconstruction system is self-calibrating, so that a user may follow basic instructions for the assembly of sensors in the environment and connect them to his/her video terminal (for video conferencing and interaction)—for example a standard laptop—and the system performs automatic calibration of the system. The calibration can be implemented so that it allows flexible re-configuration of the setup for example to better capture some areas of the space. In the disclosed system, the self-calibration may be a marker-based approach.

In addition to normal video cameras, 3D feature capture can be based also on depth sensors, as also they are equipped with image sensors, which can be used for detecting multiple AR markers (a marker field) in the environment. Marker fields can be used for spatial calibration, e.g. defining a system of local spatial coordinates, either by capturing them with one moving camera or several fixed cameras (or their mixture). Note that these markers can also be natural images, provided that their dimensions are known.

The real scale of the 3D captured scene is used when augmenting 3D models in their real size. The real scale may be derived based on markers, in accordance with some embodiments.

In accordance with some embodiments, the terminal device is a laptop or tablet computer including an embedded camera to capture real-time video during synchronous interactions. The pose (position and orientation) of the camera is determined and tracked.

Figure 5:
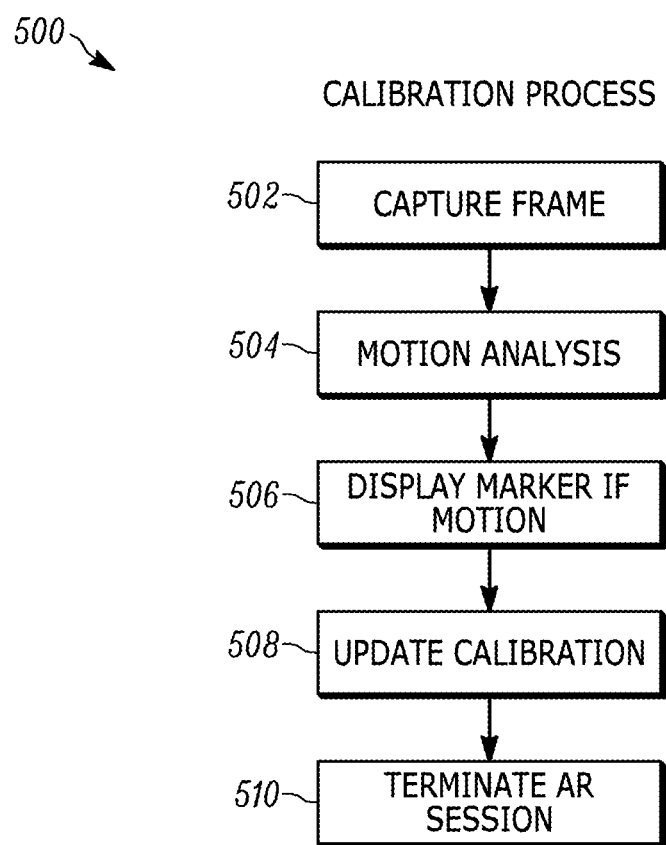
FIG. 5 depicts a calibration process, in accordance with at least one embodiment.

FIG. 5 depicts a calibration process 500, in accordance with at least one embodiment. In the calibration process 500 from the viewpoint of one camera marker, the camera captures a video frame 502. A motion analysis 504 is performed to see if the camera has moved. If the user video terminal with embedded camera has moved, a marker is displayed 506 for a pre-determined period of time. If no motion has been detected, then the next video frame is captured and analyzed for motion. The calibration of the 3D capture system is updated 508 and the calibration process may repeat until the AR session is terminated 510.

Figure 6:
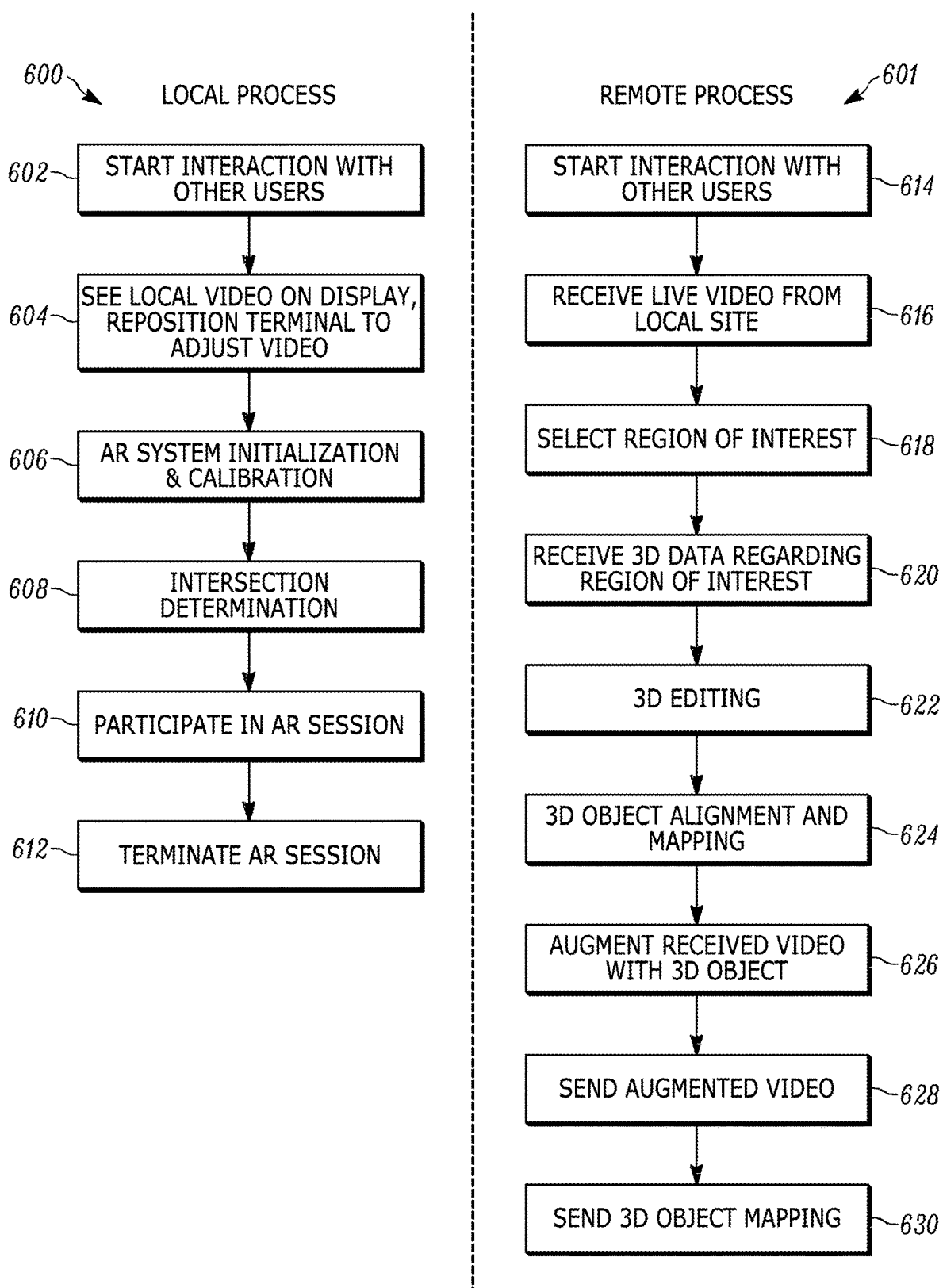
FIG. 6 depicts a local and remote AR process with calibration, in accordance with at least one embodiment.

FIG. 6 depicts a local 600 and a remote 601 AR process including calibration, in accordance with at least one embodiment. Steps 602-606, 610, and 612 of the local process 600 of FIG. 6 are similar to steps 102-110 of the local process 100 of FIG. 1, respectively, with step 606 further including calibration. Further, during the local process 600, an intersection is determined 608 by finding out the intersection of the field of view of the user terminal camera and the full set of 3D information. The user may then participate 610 in the AR session. User participation may include viewing augmentations that are local user or remote user made, create remote AR content for other users to see, moving the terminal (thus initiating another calibration, initiation, and intersection determination), stream live video and sound. Steps 614-630 of the remote AR process 601 of FIG. 6 are similar to steps 112-128 of the remote AR process 101 of FIG. 1, respectively.

In accordance with at least one embodiment, graphical markers are not utilized. The calibration may be based on 3D feature based AR on real-time video connections. Thus, no graphical markers are visible for remote users. Electronic markers may be used for system calibration and user terminal tracking.

Some embodiments do not utilize local preparations or assistance for 3D capture. The AR system is based on a distributed real-time 3D capture setup. Electronic markers are used for system calibration and user terminal tracking.

In accordance with at least one embodiment, user privacy is managed. The user privacy is managed by adjusting the real-time video view, thus determining the 3D information transmitted.

In accordance with at least one embodiment, value added features associated with video communications systems are enabled.

In embodiments with electronic markers, auto-calibration is enabled for the distributed camera system and the terminal device and provides for an absolute scale system. Since the markers are electronic, they can be programmed to appear only during calibration, thus reducing visibility, and are also not visible to remote users.

In at least one embodiment, downward compatibility and non-symmetrical interaction is supported. A user with a conventional video conferencing capability may still be part of the interaction without requiring a 3D capturing setup installed. The users without the 3D capturing setup can still view 3D augmentations in their own local space and can produce augmentations. Downward compatibility with current video communication systems permits AR interaction functionalities and services.

The systems depicted in FIGS. 2 and 3 may perform self-calibration processes that include markers. In such systems, a multi-camera sensor system is used to determine 3D data and a terminal device with a camera is used to capture the video stream. The terminal device and camera may be calibrated with the multi-marker setup, with respect to its 3D reconstruction result. With calibration of both the terminal camera and the multi-camera system, the front end is able to form the truncated 3D model by obtaining the intersection of the 3D reconstruction with the field of view of the camera. Also, calibration permits a remote user to select a position or object in the received video for augmentation, for the sent local 3D data to be in the correct scale and perspective with the sent video. The calibration permits the augmentation to display correctly in 3D.

In the accordance with one embodiment, multiple cameras or depth sensors are used to capture 3D data of the local environment. Automatic or self-calibration is used to simplify the assembly, take-up, and modifications of the system. In the AR system, self-calibration of a setup of multiple wide angle cameras is enabled by associating wide-angle cameras with markers. The views of the marker cameras themselves are used for the mutual calibration of all devices, and the calibration can be updated when necessary, e.g. to adapt into any possible changes in the setup.

While markers may be shown on the camera marker's display, existing calibration algorithms developed for multiple paper marker setups can be applied.

Auto-calibration, which can be applied also for multiple camera markers setup is a real time process may not include a separate calibration phase. The user may lay markers randomly on suitable places and start tracking immediately. The accuracy of the system improves on the run as the transformation matrices are updated dynamically. Calibration can also be done as a separate stage, and the results can be saved and used later with another application. The above calibration techniques may be be applied to various types of markers.

The scale may be derived using paper markers with known physical size. In another embodiment, markers are shown on electronic displays, and knowing the dimension of the image includes knowledge of the display properties (resolution, size, etc.). This information is available from the device manufacturers or the devices themselves, at least manually, but preferably automatically.

Calibration uses the video terminal camera's intrinsic parameters, and its accurate position and orientation in the local space. Camera parameters are available from the camera manufacturer and implied by the brand and model of the user terminal (e.g. a laptop or tablet). In order to detect and track the user video terminal, a marker is shown on its display. This marker, combined with knowledge of the display properties of the video terminal, can be used for calibration.

Multiple camera markers use most feasibly same type of wide-angle cameras, and can be calibrated with regard to each-other. In some embodiments, the video camera embedded in local user's terminal is included into this calibration. It is likely a camera with different parameters compared to marker cameras, but can still straightforwardly be taken into account when solving calibration equations for the extended setup.

One additional feature is however helpful for the system auto-calibration, namely showing the markers on the display for (re-)calibration, when noticing global motion of any of the marker devices or the user terminal. When detecting global motion, which may be uniform (or near uniform) motion of the whole image area, in any of the cameras, the respective display will be switched on to show a marker for a pre-set time; the appearing marker triggers a calibration (or re-calibration) process within to form a new consensus of the detected 3D features.

It is enough for the calibration process to update only the position of the moved display (marker), so that other marker displays may stay in their existing status, being inactive, or showing any other content, for example a photo.

As the 3D capture setup is typically fixed, the most likely camera and display moving is the user's video terminal. This may happen during the interaction for example when the user adjusts the angle of a laptop display. If the interaction device is a hand-held device, e.g. a tablet, motion occurs often. In such embodiments, the 3D capture setup may be calibrated less frequently, for example by showing a marker on camera marker's display in some embodiments. Instead of 3D capturing devices constantly tracking the tablet, the tablet's own camera may be used for tracking smaller (ego-) motions.

In some embodiments, the computer screen (display of terminal device) may even be detected without any marker by its distinctive shape and luminosity, or by detecting the interaction system's user interface. 3D capture can optionally be based on using 3D sensors. In this embodiment, detecting the pose of the computer camera is favorably implemented by showing a marker on the computer screen, and detecting its pose by an embedded RGB camera on one or more of the 3D sensors.

In accordance with at least one embodiment, a videoconferencing system supports spatiality so that participants have a concept of remote participant's positions in the meeting setup. An individual remote participant can be addressed by a local participant so that the other remote participants are aware they are not being addressed. This is possible by providing each user an individual viewpoint to all other meeting participants. The video conferencing system may also support AR, so that a remote participant is able to augment virtual information (3D models, animations, text, graphics, etc.) over a network to a local site. Sharing virtual objects by remote AR is a useful feature in many applications like remote guidance and social interaction. The video conferencing system also provides support for real-time sessions where users are interacting with each other and with AR content, and offline sessions where the users are not simultaneously available but can still produce or share AR content over a network. AR content can by produced, stored, and updated seamlessly in successive sessions. The system supports individual views both to other meeting participants and augmented objects, which makes the session closer to a face-to-face meeting.

AR is a concept and a set of technologies for merging of real and virtual elements to produce new visualizations—typically a video—where physical and digital objects co-exist and interact in real time. Most AR applications support real-time interaction with content (AR scene with virtual objects) which has been produced in advance or offline. In many cases, like ad hoc remote maintenance or guidance situations, more real-time production of AR content would be beneficial.

Interaction over network may be either: 1) real-time situations, where users are simultaneously interacting with each other and with AR content, and 2) off-line situations, where the users are not simultaneously available, but still want to produce or share AR content over network. Even more, support to remote AR interaction is preferably available also in real-time and offline sessions following or alternating with each other. This may be achieved using AR content that is produced, stored, and updated seamlessly in successive sessions.

Further, in future interaction solutions, support for spatiality may be beneficial so that the participants have a conception of remote participants' positions in the meeting setup. An individual remote participant can then be addressed by a local participant so that the other remote participants are aware they are not being focused. This may be accomplished with individual viewpoints to other meeting participants, which takes the interaction closer to face-to-face meeting.

Figure 7:
FIG. 7 depicts multiple views of a spatial AR system, in accordance with at least one embodiment.
Figure 7:
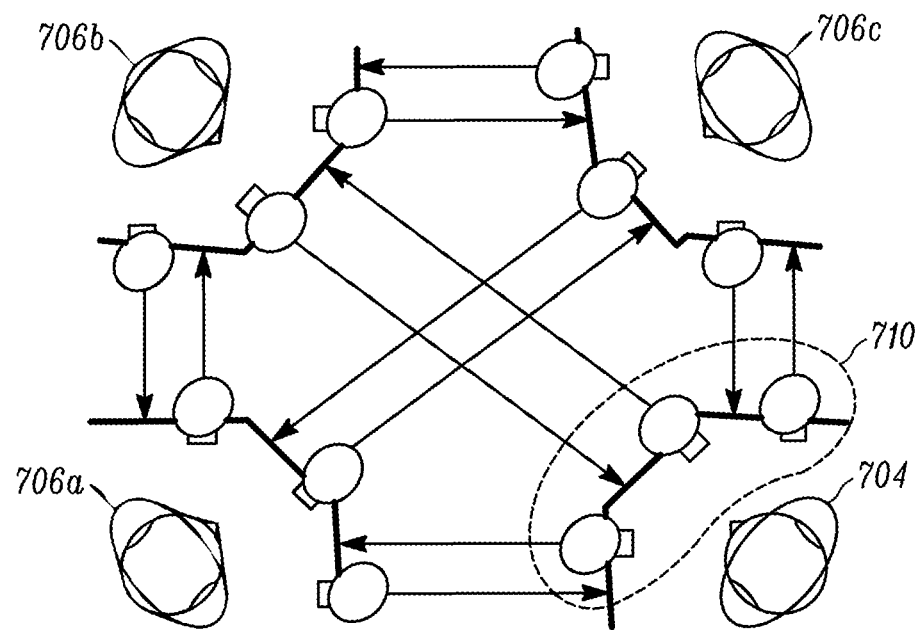

FIG. 7 depicts multiple views of a spatial AR system, in accordance with at least one embodiment. In FIG. 7, an example of a spatial AR meeting 700 between four participants is shown on top and an overview is shown on bottom. Each remote participant 706a/706b/706c is represented by a corresponding terminal 710 (sc. proxy) in the meeting space, having a display and camera for the corresponding remote participant's face and eyes. Like in a physical meeting, a given remote user is aware when the local participant 704 is watching them (due to having his/her own eyes in the room), and respectively, the other remote users know that they are not being observed. Spatial AR systems may be implemented with standard computers, cameras, and displays.

As the proxy positions in each local site do not correspond to the remote parties' actual positions, and even vary from meeting room to meeting room, the spatial cues for viewing directions are approximate. However, the information whether a person him/herself is being looked at is relatively reliably obtained (disturbed to some extent by the vertical parallax between the camera and display).

AR visualizations include a means to see augmented virtual elements as a part of the physical view. AR visualizations can be seen correctly from different viewpoints, so that when the user changes his/her viewpoint, virtual elements stay or act as if they would be part of the physical scene. This may be accomplished with AR tracking technologies for deriving 3D properties of the environment for AR content production, and for tracking the viewer's (camera) position with respect to the environment when viewing the content.

Traditionally printed graphical markers are used in the environment, to be detected from a video as a reference for both augmenting virtual information in right orientation and scale, and for tracking the viewer's (camera) position. In another embodiment, markerless AR is used, which—instead of sometimes disturbing markers relies on detecting distinctive features of the environment, and uses those features for augmenting virtual information and tracking user's position.

In embodiments with synchronous interaction, the remote and local users have a common video conference and see the virtual objects that are added to the video stream in real time. In embodiments with asynchronous communication, the video conference has ended, but the participants want to add augmentations asynchronously, between real-time sessions. In many applications, supporting synchronous and asynchronous functionalities in parallel is beneficial.

People are accustomed to use video based tools for communication and interaction. A problem with traditional video-conferencing systems is that they do not support spatial referencing, such as gaze direction, and the participants cannot infer who is looking at whom during video conference. Spatial telepresence systems supporting improved spatial awareness of participants may include a more complex device setup and higher bitrates needed.

Traditional video conferencing systems allow users to see and hear what happens in the remote site, but the users cannot interact with the remote environment. Remote AR systems allow users to interact with virtual objects augmented to the remote environment, either synchronously or asynchronously. A common problem is that—like in conventional videoconferencing—only one camera is used at each site, which does not give enough view-points or information to remotely place an augmentation accurately in desired 3D position. Furthermore, the existing remote AR systems do not support remote augmentation in a multi-point setup.

When using video, users have a good understanding and control of what they show to the outside, in order to protect their privacy. Typically they pay attention to what is being captured by their local camera before joining to a video meeting, when choosing their position and outgoing view. When 3D properties of the remote user environment are delivered for remote AR content production, privacy protection becomes even more complicated, since a 3D capture system can capture objects outside the video view.

Use of modern interaction services (e.g. Skype, Facebook) typically include a series of asynchronous and/or synchronous actions. Similar ways of use are needed also for future interaction systems with AR functionalities.

3D capture and transmission based telepresence systems may not be compatible with current video conferencing systems and terminals. In order to experience the increased immersion and spatiality, all users benefit from a new telepresence terminal. The users are challenged by learning the use of new devices, and ways of communication and interaction, and need to trust also multiple 3D sensors or cameras preserving their privacy well enough compared to current videoconferencing systems. Compatibility with existing video based systems would be a big benefit, not only relating the above needs, but also relating the cost and speed of the take-up for those new systems.

In accordance with one embodiment, remote AR functionalities are included in a spatial videoconferencing/telepresence system.

In at least one embodiment, AR visualizations are displayed as part of the physical view. This may be accomplished by manipulating, or augmenting, real-time video. A fixed local infrastructure is configured to capture and deliver local 3D properties to remote users. A remote user is able to edit the AR scene by adding AR objects based to the scene based on the 3D properties of the scene. The added AR objects can be e.g. 3D models, 3D scanned real objects, and audio sources. The resulting AR scene is viewed by users in a modified real-time video from the physical environment.

In some embodiments, audio channels are associated with each of the multiple video conferencing devices using a spatial audio system with multiple channels and speakers. The spatial audio system with directional and distance-based sounds of the augmented audio sources in the environment.

In each local site, there are corresponding videoconferencing devices (e.g. a laptop with a camera) for each remote participant. For example, in FIG. 7, there are three videoconferencing devices in local user's 704 user terminal 710: one for each of remote user 706a/706b/706c. Now, each of the videoconferencing devices corresponds to the local video terminal described above, making an intersection with the local 3D reconstruction result (formed by fixed capture setup), being calibrated and tracked with the local 3D capturing setup, and supporting synchronous and asynchronous interactions. Various systems and methods can be used to make the 3D reconstruction, including multiple depth sensors.

An exemplary combination of technical solutions enables participants of the spatial AR systems to deliver augmentations (3D objects, animations, images, graphics, text, etc.) to each of the other participant's meeting space, and to see those augmentations from the view-points defined by their own proxy device's (microphone, camera and display) viewpoint.

This ability to deliver objects and information over network makes the spatial AR systems more interesting and useful, and more close to interactions used in face-to-face meeting, where sharing views to physical object is a natural and important part of the interaction.

The disclosed systems and methods provided a new type of social interaction platforms supporting remote AR interactions. With social interaction platforms we mean solutions and services supporting both real-time communications and asynchronous messaging between multiple remote people. Examples of such services without support for AR or spatial awareness are Skype and Facebook, and various messaging, videoconferencing, and telepresence products. In at least one embodiment, the spatial AR system uses the capture and transmission of perspective videos, which are also used for deriving the positions for 3D objects augmented into each participant's environment. These embodiments improve the simplicity and naturalness of video based communication and interaction, and they offer bitrate savings compared to real-time 3D transmission.

In some embodiments, the users are assigned into fixed locations in the AR spatial system. Some embodiments may maintain a fixed meeting geometry, while alternative embodiments may support a more dynamic positioning scheme.

Figure 8:
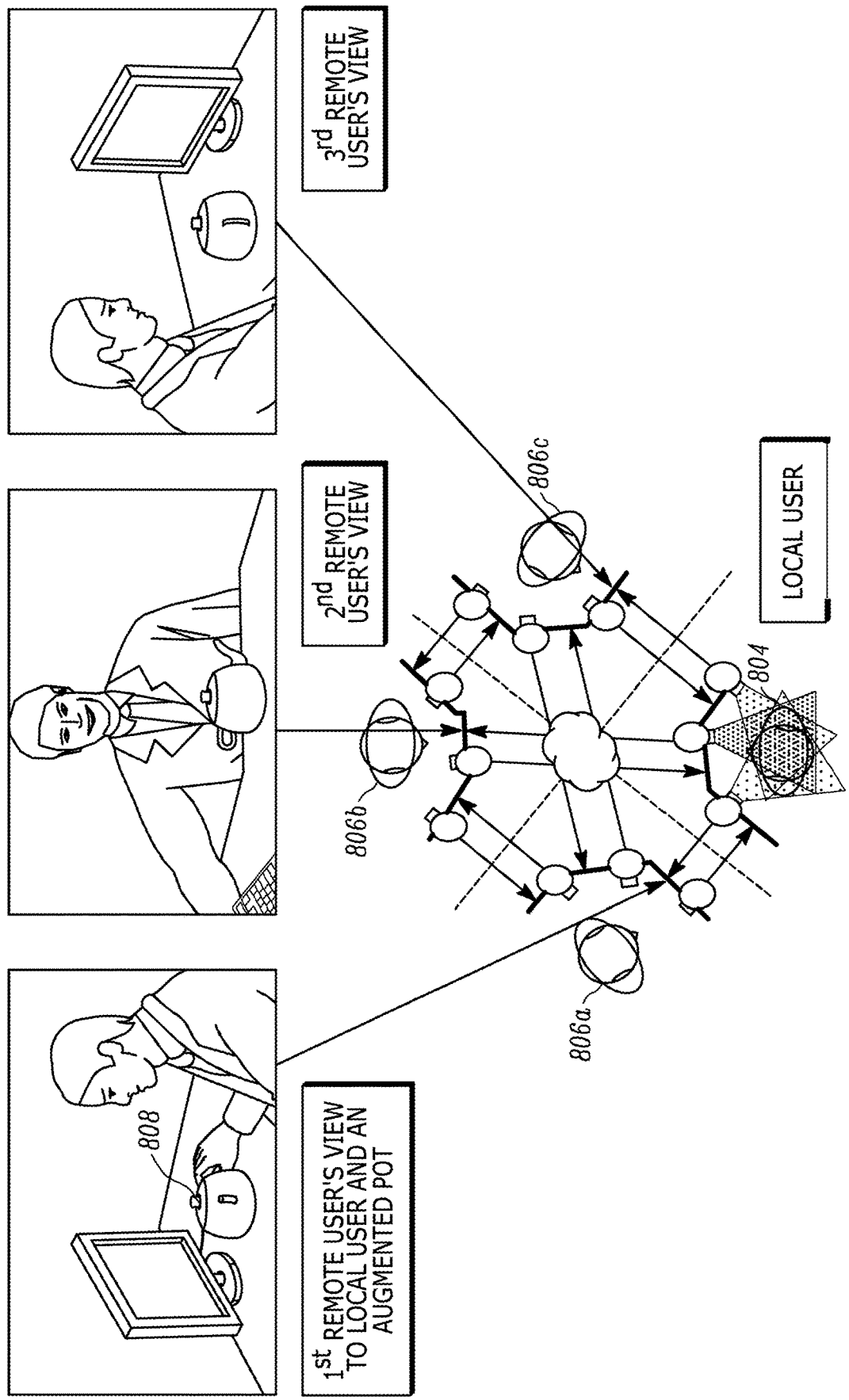
FIG. 8 depicts a spatial AR interaction system, in accordance with at least one embodiment.

FIG. 8 depicts a spatial AR interaction system, in accordance with at least one embodiment. In FIG. 8, the spatial AR interaction system shows three views of a local user 804 with a remotely augmented object 808 of a teapot. The perspective views are individual for all three remote participants 806a/806b/806c. Any one of the remote participants can augment the augmented object appearing in the local space.

Figure 9:
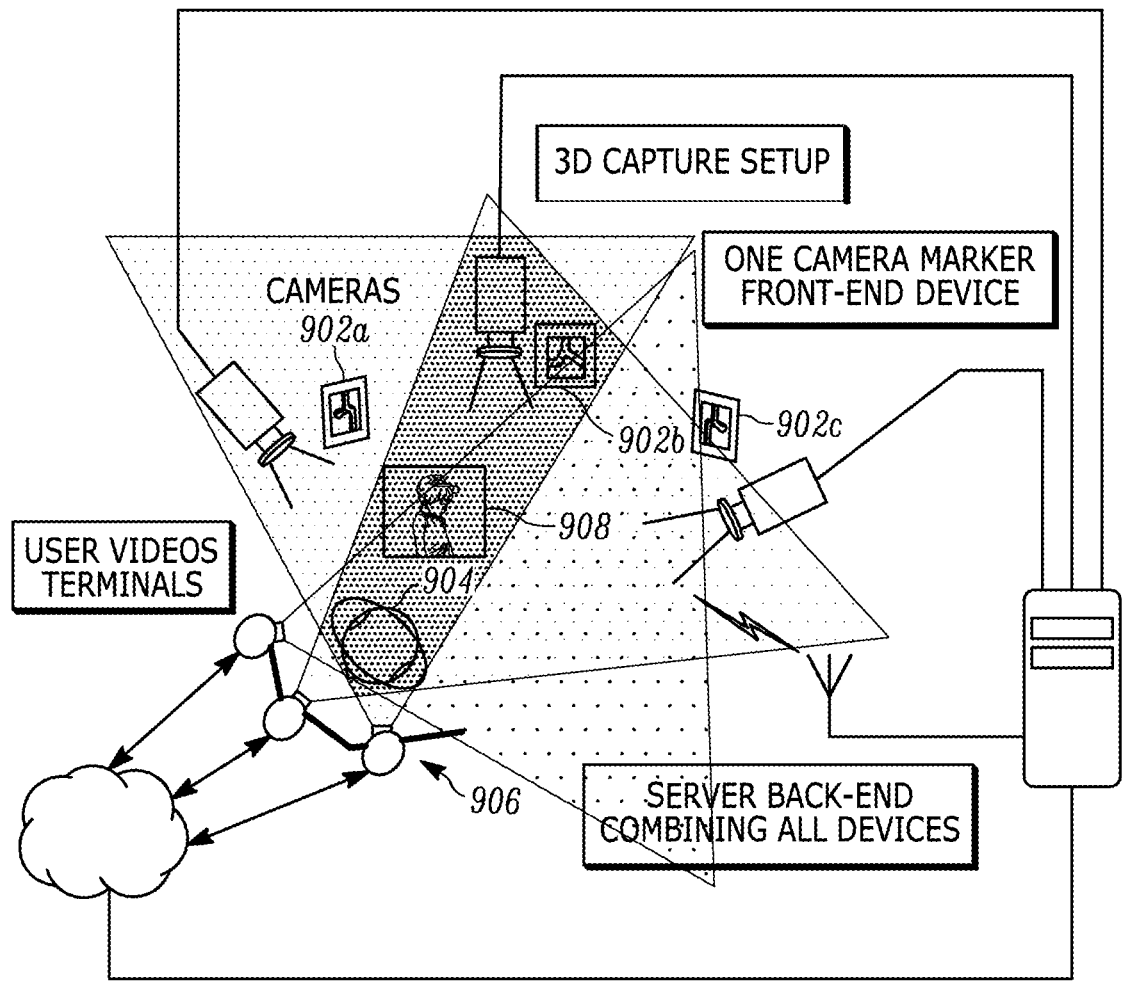
FIG. 9 depicts a multi-view video terminal combined with a 3D capture system, in accordance with at least one embodiment.

FIG. 9 depicts a multi-view video terminal combined with a 3D capture system, in accordance with at least one embodiment. In FIG. 9, the 3D capture system is implemented with camera markers 902a/902b/902c. At least one site in the system includes the ability to have the capture system to enable remote augmentations. In these embodiments, the local user exposes his environment as a 3D model to other remote users by using a 3D capture system. The local user also has a main spatial video terminal 906 that sends perspective video streams to remote users. A remote user has a remote user terminal (not shown) with remote interaction application that is configurable of receiving the video stream from the local user and selecting positions, orientation, and scale (pose) of each new virtual object (AR object 908) in the local user's 3D environment model.

In a synchronous interaction embodiment, the session includes (i) the 3D capture system (multi-camera or multi-sensor system able to create a 3D model of the local user's environment); (ii) a main spatial video terminal for the local user (e.g. several laptops with video cameras, or a dedicated system); (iii) remote spatial video terminal, configurable of receiving video streams from other users and running a synchronous remote interaction application; (iv) a video streaming application, configurable to stream the local user's videos to remote users; (v) a video augmenting application, configurable of augmenting AR objects to video; and (vi) a synchronous remote interaction application configurable to receive video streams from a local user's main spatial video terminal and side views generated by the local user's capture setup and further configurable to add new AR objects to the local user's 3D environment by setting a pose from a chosen video stream and related side views. The session may also include a spatial audio system, for example, an audio surround system with multiple channels and speakers.

In an asynchronous interaction embodiment, the session includes the elements of the synchronous interaction, but also includes an asynchronous remote interaction application (scene editor) for setting the pose for AR objects in the 3D model captured from the remote environment. Additional components to the AR system may include a backend server for storage of 3D capture results and AR objects for asynchronous interaction, application servers for delivering video streams and augmenting the AR objects, a session manager for orchestration of sessions, and a storage manager for managing the transition between synchronous and asynchronous sessions.

In accordance with at least one embodiment, sensors support 3D capture and system calibration, including deriving real scale for the result. Other means of 3D capture and reconstruction are however possible, including depth sensors (e.g RGB-D and ToF). Other camera based capture setups with a solution for deducing the scale can also be used. This is possible for example by deriving the real world position of the cameras with some accurate enough method, e.g. gyroscopes and accelerometers (IMUs).

The spatial AR system can include the methods of forming an intersection between a field of view of a local video terminal's camera view and the full set of 3D captured information of the local space. This enhances a local user's privacy by limiting the outgoing information to the part inside the local camera's viewing field. It is desirable for this information to be sufficient for remote user(s) to position accurate augmentations into the local space. The intersection is defined geometrically by a rectangular viewing pyramid opening towards the local space, along the camera's viewing direction, with the apex of the pyramid behind the camera lens.

The local space may contain separate video terminals for each remote user. The process may be repeated for each of these terminals. A remote user gets 3D captured data from inside his/her own video view, which enables augmenting this view accurately by chosen AR objects. A remote user can see also augmentations made by other remote users, provided that they are inside his/her field of view. This enables spatial collaboration on these objects with other users.

The spatial AR system may form the intersection of a full 3D model and fields of view of local cameras based on different sensor assumptions for the sensor system or its calibration scheme. An exemplary 3D capture setup based on electronic markers due to the simplicity of marker based calibration may be used. However, other calibration procedures may also be used, as described herein.

In accordance with one embodiment, the 3D capture setup tracks and calibrates several (e.g. all) video terminals used in the local space.

From an individual remote user's point of view, the various AR functionalities are provided according the principles described herein. A 3D model of local environment is produced during a synchronous session. This model is used by local or remote user(s) as a spatial reference for producing an accurate AR scene, e.g. a compilation of virtual elements, each with precise position, orientation, and scale.

In synchronous interaction, this 3D data is provided to each remote user together with their own real-time video view of the local space. Video views are generated by the local video terminals, for example laptops, each having a video camera and display. Each AR scene can be produced using both 3D intersection data and respective video view.

For supporting asynchronous interactions, the 3D data generated during synchronous session are stored and can be accessed by the remote users for AR scene creation.

Spatiality helps to understand and memorize a message, and builds awareness about the identities, roles, actions, and information flow between participants. The spatial AR system may further include awareness of gaze and voice directions.

The user's control on showing his/her surroundings is based on familiar concepts of video communication, including ways of controlling one's privacy. By having these properties, the spatial AR system meets provides for increased privacy for the user.

The spatial AR system applies the principles of 1) providing each local participant different viewpoints to their remote counterparts by a multi-camera setup, and 2) supporting interactive changes of such viewpoints in order to make precise 3D augmentations to remote environments. In both cases, viewpoints are transmitted as video signals with considerably less bandwidth or bits compared to typical 3D telepresence systems. Those are namely based on capturing and delivering remote views as wide-base real-time 3D reconstructions, thus wasting bandwidth, as a user can anyway at each time choose to see only an instantaneous perspective to the result.

Downward compatibility with current video communication systems is supported in the spatial AR interaction functionalities and services. One advantage of calibrating the 3D capture result with the user's video interaction terminal is that a user with conventional video conferencing capabilities can be part of the interaction, without having himself a 3D capturing setup installed.

Interaction is possible for example when terminal capabilities differ in the following ways:
1. Remote user does not have a 3D capture setup
   the user can communicate using a spatial video terminal
   other users cannot make augmentations to his/her environment
   the user can make augmentations to those local environments (users) that have the capture setup
2. Remote user does not have a spatial video terminal
   the user can communicate using normal (non-spatial) video terminal
   other users can see and augment one local video view (without having individual viewpoints)
3. Remote user does not have a remote interaction application
   the user can communicate using spatial video terminal
   the user can see remote augmentations but not augment him/herself Reduced terminal properties show up as reduced and non-symmetric interaction capabilities for users. Allowing the use of more simple terminals supports for example backward compatibility with existing video conferencing systems.

In accordance with at least one embodiment, an intersection is formed of the full 3D reconstruction result and each video view in the spatial AR system. As disclosed above, the method to determine the intersection may vary, for example for improving user privacy, relieving the restrictions for trusted friends, or giving up restrictions altogether when augmenting the local space only for one's own use. In addition, having several viewing pyramids and 3D intersections in the local space enables further variations on their combination. For example, forming the combined 3D intersection as union of separate intersections or intersection of separate intersections.

In an example use case of a spatial AR system, a local user, a first remote user and a second remote user are having an enhanced video conference using the system described above. They all have set the system in their apartments. The local user has a pile of laundry in the corner of his/her room and (s)he has positioned the cameras so that the remote users cannot see the pile in the video streams.

The first remote user has a 3D model of a piece of furniture (s)he thinks looks good in the local user's environment. The first remote user selects a position where (s)he wants to add the furniture model, by pointing on the video view coming from the local user's environment. Next (s)he selects side view(s) of the local user's environment in order to place the model more precisely into correct position. Even though the 3D capture system creates a 3D model of the whole room, the remote users cannot see the pile of laundry in any of the side views, because the system shows only those objects that are included in the truncated 3D model streamed to the remote users.

While the first remote user is positioning the furniture model into the local user's environment, the second remote user and the local user see that the first remote user is looking at the local user's environment, because the system uses a spatial telepresence setup. Further, when the second remote user and the local user are conversing with each other, they are aware of each other's attention, because of the spatial AR setup.

All participants can see the furniture model augmented to the video streams from the local user's environment. In addition, the local user can see it from different viewpoints using AR glasses. The furniture may be automatically scaled to the correct size due to system self-calibration, and thus the augmented furniture looks natural in its environment. When the conference ends, a 3D model of the local user's environment is stored on the server. The second remote user may go to a furniture store and see another interesting piece of furniture. The second remote user may obtain the 3D model of the new furniture and now, using his/her mobile terminal, may replace the earlier one in the local user's environment stored on server.

The local user can see the additions using a mobile terminal, using a 3D browser while mobile (outside the local user's stored environment). Finally, when the local user returns to his/her environment, (s)he can see the new furniture augmented into the video view, and all the participants can see it augmented to the videos when they have their next video conference.

Figure 10:
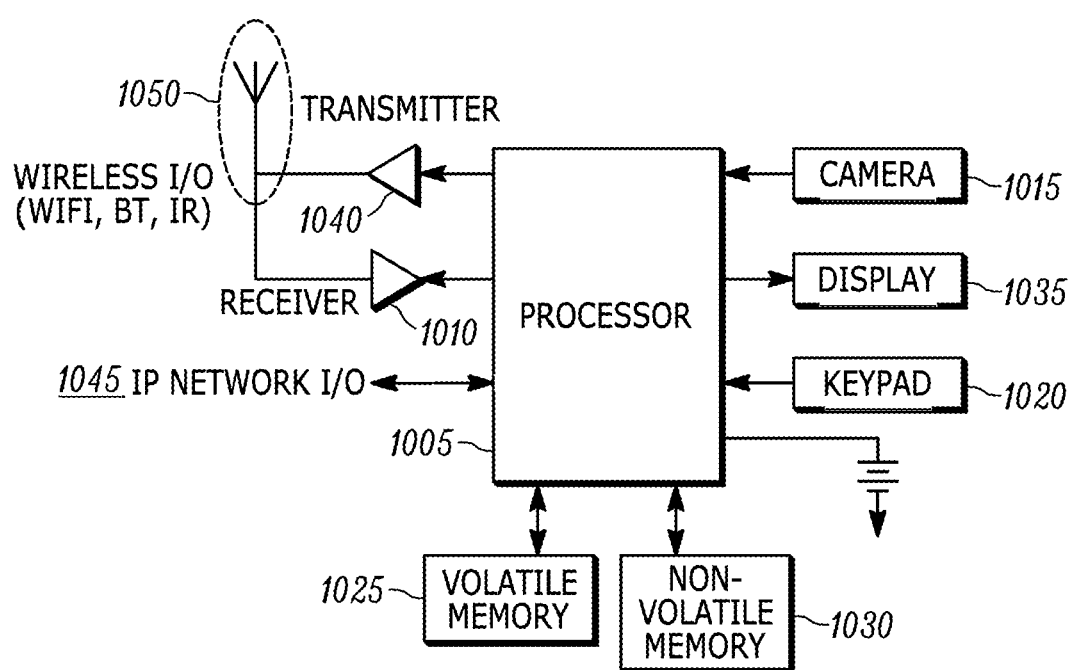
FIG. 10 is a functional block diagram of components of a camera marker device.

FIG. 10 is a functional block diagram of components of a camera marker device. As shown, the camera marker device includes a processor 1005 receiving information from one or more devices, including a receiver 1010 of wireless connection 1050, camera 1015, keypad 1020, and wired IP network 1045. Further, processor 1005 may have access to volatile memory 1025 and non-volatile memory 1030. The processor 1005 may display processed information on display 1035, as well as transmit the processed information via transmitter 1040 and/or IP network 1045. It should be noted that the camera marker device may include a subset of the above-listed components, or alternatively it may include additional components.

In some embodiments, a camera marker is provided with audio capture and playback features. Audio may be used to increase the attractiveness and effectiveness of the videos used for announcing/advertising the available AR content. Audio may also be used as a component of the augmented AR content. A microphone can be used to capture user responses or commands.

When building up a multi-marker setup, various combinations of electronic and paper markers are feasible. In such a setup, for example, a paper marker on the floor could specify the floor level without the risk of an electronic device being stepped on. Paper markers may also be used as a way to balance the trade-off between calibration accuracy and system cost. In addition to graphical markers, also natural print-out pictures can be used as part of a hybrid marker setup. Even natural planar or 3D feature sets can be detected by multiple camera markers and used for augmenting 3D objects.

In some embodiments, at least some local processing is performed via processor 1005 in each marker device in order to reduce the amount of information to be transmitted to the common server via transmitter 1040 or IP network 1045. Marker detection is one of such local operations. Note that camera marker setup is relatively stable, and tracking in camera markers is not needed to such an extent as in the user's viewing device (AR glasses or tablet), which is moving along with the user. Another example is the control of a wide-angle camera 1015 in order to capture, for example, cropped views of other markers (for marker detection and identification), or user's visual parameters. A third example for local processing is to use camera view for deriving the actual lighting conditions in the environment in order to adapt the respective properties for the virtual content for improved photorealism.

Instead of just with visual cameras, camera markers can be equipped with 3D cameras, such as RGB-D or ToF sensors, for capturing depth information. As the success of, e.g. the Kinect camera has shown, it can increase the versatility and performance of related functionalities and services. The use of camera markers may encourage the acceptance of 3D cameras as a ubiquitous part of users' environment.

Together with the knowledge of the user's real view-point (the information obtained e.g. by analyzing the captured 3D scene, or obtained from virtual glasses), the 3D captured scene can be used to implement the sc. accurate user-perspective AR rendering. A more traditional way of capturing 3D information is to use two (e.g. stereo) or more cameras.

As described above, multiple markers can be used in AR both to give more and better 3D data of the environment. To provide this benefit, multiple markers are calibrated with respect to each other and the scene. Typically, calibration is performed by capturing the multi-marker scene by a moving external camera and making geometrical calculations from its views.

Providing the markers with wide-angle cameras enables self-calibration in a multiple camera-marker system. The views of the marker cameras themselves can be used for the mutual calibration of all devices, and the calibration can be updated when necessary, e.g. to adapt into any possible changes in the setup.

In some embodiments, the functions of the described camera marker are performed using a general purpose consumer tablet computer. In some embodiments, the tablet computer may take the form of the camera marker system shown in FIG. 10. A tablet computer is generally provided with components such as a display 1035, camera 1015 (though typically not with wide-angle optics), and wired 1045 and wireless 1050 network connections. In some embodiments, a camera marker is implemented using dedicated software running on a processor 1005 in the tablet device. The software may be stored and retrieved from volatile memory 1025 and non-volatile memory 1030. In some embodiments, the camera marker is implemented using a special-purpose version of a tablet computer. The special-purpose version of the tablet computer may, for example, have reduced memory, lower screen resolution (possibly greyscale only), wide-angle optics, and may be pre-loaded with appropriate software to enable camera marker functionality. In some embodiments, inessential functionality such as GPS, magnetometer, and audio functions may be omitted from the special-purpose tablet computer.

Exemplary embodiments disclosed herein are implemented using one or more wired and/or wireless network nodes, such as a wireless transmit/receive unit (WTRU) or other network entity.

Figure 11:
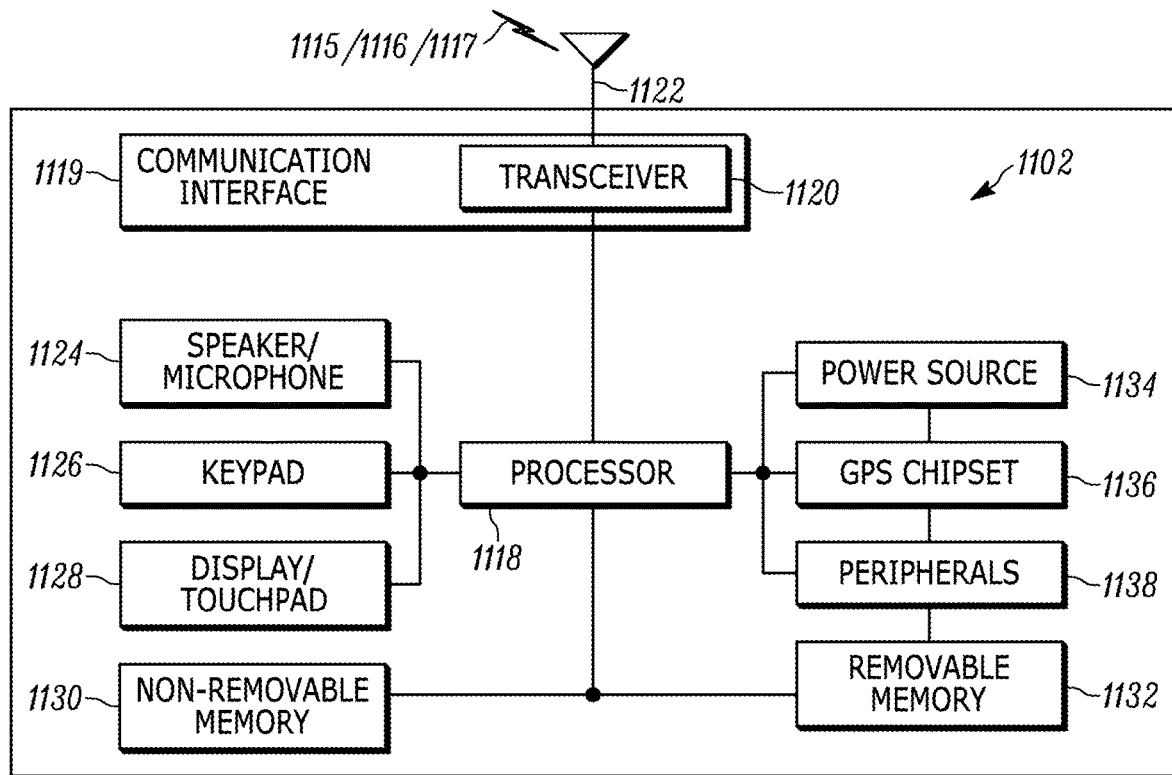
FIG. 11 illustrates an exemplary wireless transmit/receive unit (WTRU) that may be employed as camera marker or common position server in some embodiments.

FIG. 11 is a system diagram of an exemplary WTRU 1102, which may be employed as a user device in embodiments described herein. As shown in FIG. 11, the WTRU 1102 may include a processor 1118, a communication interface 1119 including a transceiver 1120, a transmit/receive element 1122, a speaker/microphone 1124, a keypad 1126, a display/touchpad 1128, a non-removable memory 1130, a removable memory 1132, a power source 1134, a global positioning system (GPS) chipset 1136, and sensors 1138. It will be appreciated that the WTRU 1102 may include any sub-combination of the foregoing elements while remaining consistent with at least one embodiment.

The processor 1118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1118 may perform signal coding, data processing, power control, input/output processing, and/or any other functionality that enables the WTRU 1102 to operate in a wireless environment. The processor 1118 may be coupled to the transceiver 1120, which may be coupled to the transmit/receive element 1122. While FIG. 11 depicts the processor 1118 and the transceiver 1120 as separate components, it will be appreciated that the processor 1118 and the transceiver 1120 may be integrated together in an electronic package or chip.

The transmit/receive element 1122 may be configured to transmit signals to, or receive signals from, a base station over the air interface 1115/1116/1117. For example, in at least one embodiment, the transmit/receive element 1122 may be an antenna configured to transmit and/or receive RF signals. In another embodiment, the transmit/receive element 1122 may be an emitter/detector configured to transmit and/or receive IR, UV, or visible light signals, as examples. In yet another embodiment, the transmit/receive element 1122 may be configured to transmit and receive both RF and light signals. It will be appreciated that the transmit/receive element 1122 may be configured to transmit and/or receive any combination of wireless signals.

In addition, although the transmit/receive element 1122 is depicted in FIG. 11 as a single element, the WTRU 1102 may include any number of transmit/receive elements 1122. More specifically, the WTRU 1102 may employ MIMO technology. Thus, in at least one embodiment, the WTRU 1102 may include two or more transmit/receive elements 1122 (e.g., multiple antennas) for transmitting and receiving wireless signals over the air interface 1115/1116/1117.

The transceiver 1120 may be configured to modulate the signals that are to be transmitted by the transmit/receive element 1122 and to demodulate the signals that are received by the transmit/receive element 1122. As noted above, the WTRU 1102 may have multi-mode capabilities. Thus, the transceiver 1120 may include multiple transceivers for enabling the WTRU 1102 to communicate via multiple RATs, such as UTRA and IEEE 802.11, as examples.

The processor 1118 of the WTRU 102 may be coupled to, and may receive user input data from, the speaker/microphone 1124, the keypad 1126, and/or the display/touchpad 1128 (e.g., a liquid crystal display (LCD) display unit or organic light-emitting diode (OLED) display unit). The processor 1118 may also output user data to the speaker/microphone 1124, the keypad 1126, and/or the display/touchpad 1128. In addition, the processor 1118 may access information from, and store data in, any type of suitable memory, such as the non-removable memory 1130 and/or the removable memory 1132. The non-removable memory 1130 may include random-access memory (RAM), read-only memory (ROM), a hard disk, or any other type of memory storage device. The removable memory 1132 may include a subscriber identity module (SIM) card, a memory stick, a secure digital (SD) memory card, and the like. In other embodiments, the processor 1118 may access information from, and store data in, memory that is not physically located on the WTRU 1102, such as on a server or a home computer (not shown).

The processor 1118 may receive power from the power source 1134, and may be configured to distribute and/or control the power to the other components in the WTRU 1102. The power source 1134 may be any suitable device for powering the WTRU 1102. As examples, the power source 1134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 1118 may also be coupled to the GPS chipset 1136, which may be configured to provide location information (e.g., longitude and latitude) regarding the current location of the WTRU 1102. In addition to, or in lieu of, the information from the GPS chipset 1136, the WTRU 1102 may receive location information over the air interface 1115/1116/1117 from a base station and/or determine its location based on the timing of the signals being received from two or more nearby base stations. It will be appreciated that the WTRU 1102 may acquire location information by way of any suitable location-determination method while remaining consistent with at least one embodiment.

The processor 1118 may further be coupled to other peripherals 1138, which may include one or more software and/or hardware modules that provide additional features, functionality and/or wired or wireless connectivity. For example, the peripherals 1138 may include sensors such as an accelerometer, an e-compass, a satellite transceiver, a digital camera (for photographs or video), a universal serial bus (USB) port, a vibration device, a television transceiver, a hands-free headset, a Bluetooth® module, a frequency modulated (FM) radio unit, a digital music player, a media player, a video game player module, an Internet browser, and the like.

Figure 12:
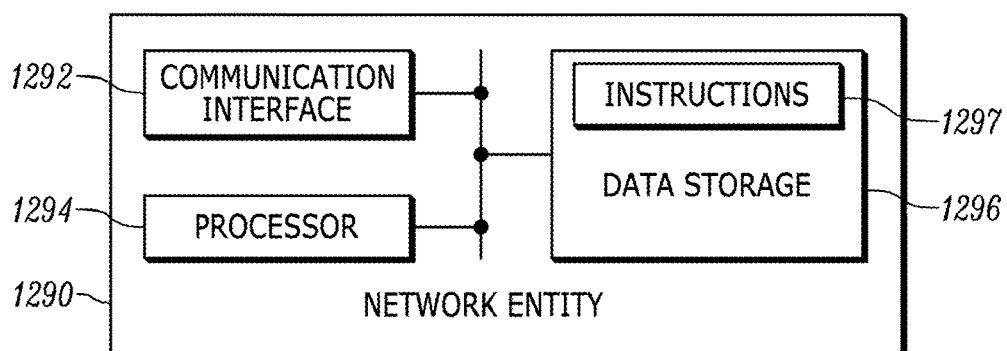
FIG. 12 illustrates an exemplary network entity that may be employed as a camera marker, common position server, or back-end service in some embodiments.

FIG. 12 depicts an exemplary network entity 1290 that may be used in embodiments of the present disclosure, for example as a common server used for the setup of one or more camera markers. As depicted in FIG. 12, network entity 1290 includes a communication interface 1292, a processor 1294, and non-transitory data storage 1296, all of which are communicatively linked by a bus, network, or other communication path 1298.

Communication interface 1292 may include one or more wired communication interfaces and/or one or more wireless-communication interfaces. With respect to wired communication, communication interface 1292 may include one or more interfaces such as Ethernet interfaces, as an example. With respect to wireless communication, communication interface 1292 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 1292 may be equipped at a scale and with a configuration appropriate for acting on the network side—as opposed to the client side—of wireless communications (e.g., LTE communications, Wi-Fi communications, and the like). Thus, communication interface 1292 may include the appropriate equipment and circuitry (perhaps including multiple transceivers) for serving multiple mobile stations, UEs, or other access terminals in a coverage area.

Processor 1294 may include one or more processors of any type deemed suitable by those of skill in the relevant art, some examples including a general-purpose microprocessor and a dedicated DSP.

Data storage 1296 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 12, data storage 196 contains program instructions 1297 executable by processor 1294 for carrying out various combinations of the various network-entity functions described herein.

Figure 13:
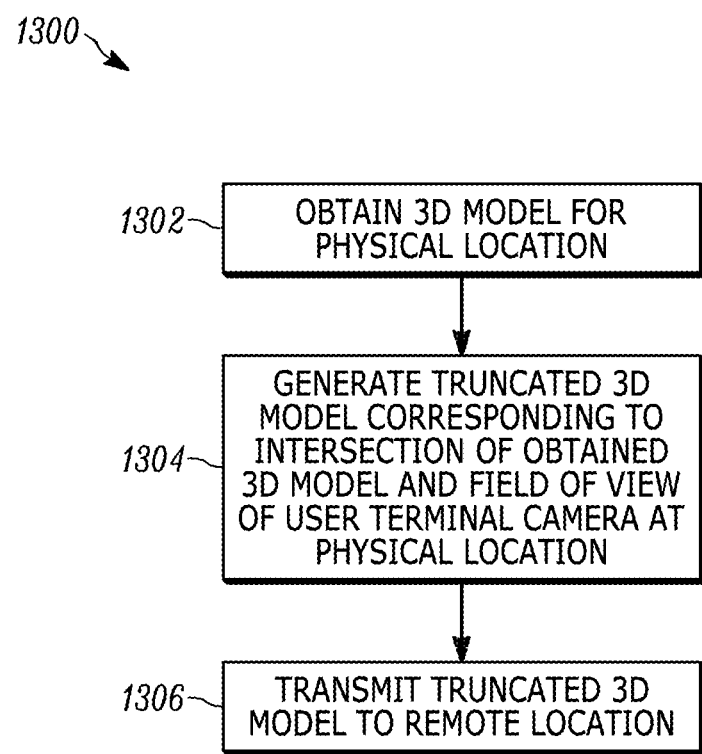
FIG. 13 depicts an example method, in accordance with at least one embodiment.

In some embodiments, the WTRU 1102 and network entity 1190 form an AR telepresence system for carrying out method 1300 of FIG. 13. As shown method 1300 includes the steps of obtaining, at step 1302, a 3D model of a physical location from a 3D-capture system comprising one or more 3D depth sensors disposed throughout the physical location. At step 1304, a truncated 3D model of the physical location is generated, the truncated 3D model corresponding to the intersection of the generated 3D model and a field of view of a user terminal camera at the physical location. At step 306, the truncated 3D model is transmitted to a remote location.

In some embodiments, the field of view of the user terminal camera is determined at least in part by identifying image data related to positions of markers in the physical location and using the positions to determine the field of view of the user terminal camera.

In some embodiments, a display device at the remote location displays an arbitrary view point of the truncated 3D model including rendered objects only within a field of view of the user terminal camera.

In some embodiments, the method 1300 further includes receiving location information for placing a virtual object in the 3D model of the physical location. In some embodiments, the location information corresponds to a location in the physical location inside the truncated 3D model. In some embodiments, the location information corresponds to a location in the physical location outside the truncated 3D model. In some embodiments, the method 1300 further includes obtaining a 3D model of the virtual object from a database. In some embodiments, the method 1300 further includes receiving a 3D model of the virtual object from the remote location.

In some embodiments, the method 1300 further includes receiving a virtual camera control command from the remote location, and responsively generating a corresponding perspective view of the truncated 3D model.

In some embodiments, the method further includes generating a second truncated 3D model corresponding to the intersection of the generated 3D model and a second field of view of a second user terminal camera at the physical location and transmitting the second truncated 3D model to a second remote location.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   obtaining a 3D model of a physical location from a 3D-capture system comprising one or more 3D depth sensors disposed throughout the physical location;
   generating a truncated 3D model of the physical location, the truncated 3D model corresponding to the intersection of the generated 3D model and a field of view of a user terminal camera at the physical location; and
   transmitting the truncated 3D model to a remote location.

2. The method of claim 1, wherein the field of view of the user terminal camera is determined at least in part by identifying image data related to positions of markers in the physical location and using the positions to determine the field of view of the user terminal camera.

3. The method of claim 1, wherein a display device at the remote location displays an arbitrary view point of the truncated 3D model including rendered objects only within a field of view of the user terminal camera.

4. The method of claim 1, further comprising receiving location information for placing a virtual object in the 3D model of the physical location.

5. The method of claim 4, wherein the location information corresponds to a location in the physical location inside the truncated 3D model.

6. The method of claim 4, wherein the location information corresponds to a location in the physical location outside the truncated 3D model.

7. The method of claim 4, further comprising obtaining a 3D model of the virtual object from a database.

8. The method of claim 4, further comprising receiving a 3D model of the virtual object from the remote location.

9. The method of claim 1, further comprising receiving a virtual camera control command from the remote location, and responsively generating a corresponding perspective view of the truncated 3D model.

10. The method of claim 1, further comprising:
    generating a second truncated 3D model corresponding to the intersection of the generated 3D model and a second field of view of a second user terminal camera at the physical location; and
    transmitting the second truncated 3D model to a second remote location.

11. A system comprising a non-transitory computer readable medium for carrying one or more instructions, wherein the one or more instructions, when executed by one or more processors, causes the one or more processors to perform the steps of:
    obtaining a 3D model of a physical location from a 3D-capture system comprising one or more 3D depth sensors disposed throughout the physical location;
    generating a truncated 3D model of the physical location, the truncated 3D model corresponding to the intersection of the generated 3D model and a field of view of a user terminal camera at the physical location; and
    transmitting the truncated 3D model to a remote location.

12. The system of claim 11, wherein the non-transitory computer readable medium comprises instructions for determining the field of view of the user terminal camera at least in part by identifying image data related to positions of markers in the physical location and using the positions to determine the field of view of the user terminal camera.

13. The system of claim 11, wherein a display device at the remote location displays an arbitrary view point of the truncated 3D model including rendered objects only within a field of view of the user terminal camera.

14. The system of claim 11, wherein the non-transitory computer readable medium further comprises instructions for receiving location information for placing a virtual object in the 3D model of the physical location.

15. The system of claim 14, wherein the location information corresponds to a location in the physical location inside the truncated 3D model.

16. The system of claim 14, wherein the location information corresponds to a location in the physical location outside the truncated 3D model.

17. The system of claim 14, wherein the non-transitory computer readable medium further comprises instructions for obtaining a 3D model of the virtual object from a database.

18. The system of claim 14, wherein the non-transitory computer readable medium further comprises instructions for receiving a 3D model of the virtual object from the remote location.

19. The system of claim 11, wherein the non-transitory computer readable medium further comprises instructions for receiving a virtual camera control command from the remote location, and responsively generating a corresponding perspective view of the truncated 3D model.

20. The system of claim 11, wherein the non-transitory computer readable medium further comprises instructions for:
    generating a second truncated 3D model corresponding to the intersection of the generated 3D model and a second field of view of a second user terminal camera at the physical location; and
    transmitting the second truncated 3D model to a second remote location.

* * * * *